US012732884B2

(12) United States Patent
Fujishiro et al.

(10) Patent No.: US 12,732,884 B2
(45) Date of Patent: Sep. 8, 2026

(54) COMMUNICATION CONTROL METHOD USED IN A CELLULAR COMMUNICATION SYSTEM

(71) Applicant: KYOCERA CORPORATION, Kyoto (JP)

(72) Inventors: Masato Fujishiro, Yokohama (JP); Henry Chang, San Diego, CA (US)

(73) Assignee: KYOCERA Corporation, Kyoto (JP)

( * ) Notice: Subject to any disclaimer, the term of this patent is extended or adjusted under 35 U.S.C. 154(b) by 397 days.

(21) Appl. No.: 18/347,228

(22) Filed: Jul. 5, 2023

(65) Prior Publication Data

US 2023/0354139 A1 Nov. 2, 2023

Related U.S. Application Data

(63) Continuation of application No. PCT/JP2021/047568, filed on Dec. 22, 2021.

(60) Provisional application No. 63/134,275, filed on Jan. 6, 2021.

(51) Int. Cl.
*H04W 36/36* (2009.01)
*H04W 36/24* (2009.01)
*H04W 36/30* (2009.01)

(52) U.S. Cl.
CPC ....... *H04W 36/362* (2023.05); *H04W 36/249* (2023.05); *H04W 36/305* (2018.08)

(58) Field of Classification Search
CPC ............. H04W 36/362; H04W 36/249; H04W 36/305; H04W 16/26; H04W 24/04; H04W 92/20
See application file for complete search history.

(56) References Cited

U.S. PATENT DOCUMENTS 12,213,199 B2 * 1/2025 Fujishiro ............. H04W 36/305
2015/0249950 A1 9/2015 Teyeb et al.
2017/0257816 A1 9/2017 Teyeb et al.
2020/0267795 A1 8/2020 Jung et al.
2021/0222606 A1 * 7/2021 Geskes ................. F28F 27/006
2022/0007254 A1 * 1/2022 Da Silva ......... H04W 36/00838
(Continued)

FOREIGN PATENT DOCUMENTS

JP 2017-513255 A 5/2017
WO 2020/128848 A1 6/2020
(Continued)

OTHER PUBLICATIONS

"3rd Generation Partnership Project; Technical Specification Group Radio Access Network; NR; NR and NG-RAN Overall Description; Stage 2"; Release 16; 3GPP TS 38.300 V16.3.0 (Sep. 2020); pp. 1-148.

*Primary Examiner* — Mounir Moutaouakil
(74) *Attorney, Agent, or Firm* — Studebaker Brackett PLLC

(57) ABSTRACT

In a first aspect, a communication control method is used in a cellular communication system. The communication control method includes receiving, by a relay node, a flow control feedback message or a failure occurrence notification message from a parent node of the relay node. The communication control method includes executing, by the relay node, a conditional handover in response to a certain period elapsing after receiving the flow control feedback message or the failure occurrence notification message.

7 Claims, 18 Drawing Sheets

(56) References Cited

U.S. PATENT DOCUMENTS

| | | | | |
|---|---|---|---|---|
| 2022/0015000 | A1 | 1/2022 | Fujishiro et al. | |
| 2022/0022116 | A1 | 1/2022 | Hasegawa | |
| 2022/0070752 | A1* | 3/2022 | Kim | H04W 24/08 |
| 2022/0167382 | A1* | 5/2022 | Zhuo | H04W 72/20 |
| 2022/0182903 | A1* | 6/2022 | Ishii | H04W 36/0058 |
| 2022/0183105 | A1* | 6/2022 | Muhammad | H04W 76/30 |
| 2022/0210822 | A1* | 6/2022 | Hassan | H04W 72/542 |

FOREIGN PATENT DOCUMENTS

| | | | |
|---|---|---|---|
| WO | 2020/196201 | A1 | 10/2020 |
| WO | 2020/202447 | A1 | 10/2020 |

* cited by examiner

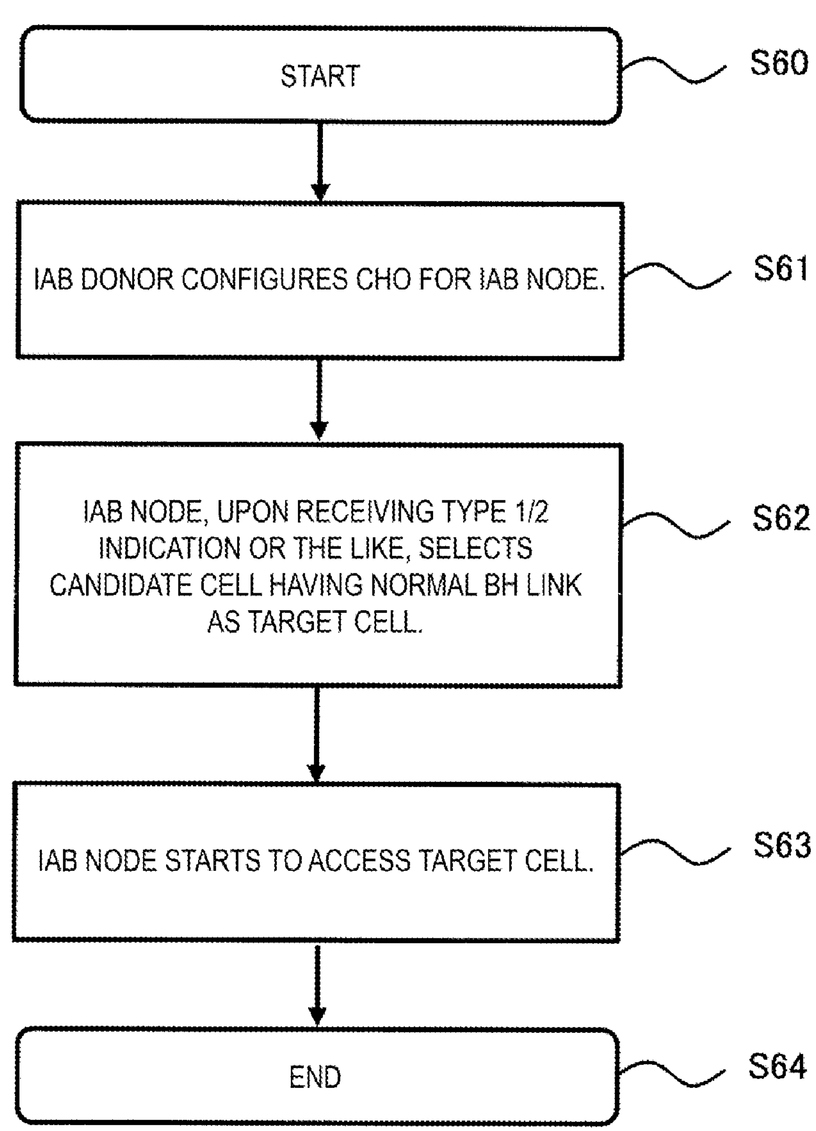

FIG. 17

- Type 1 – "Plain" notification: Indication that BH link RLF is detected by the child IAB-node.
- Type 2 – "Trying to recover": Indication that BH link RLF is detected, and the child IAB-node is attempting to recover from it.
- Type 3 – "BH link recovered": Indication that the BH link successfully recovers from RLF.
- Type 4 – "Recovery failure": Indication that the BH link RLF recovery failure occurs.
- Type 4x – "Indicating child nodes to perform RLF procedure": it is implementation when the parent sending this indication, and the child node should perform RLF related procedure when receiving this indication.

FIG. 18

IAB-node
Parent node
BH RLF detected
BH RLF Recovery
BH RLF Recovered
Type 2 Indication
Type 3 Indication
Notice problem fixed
Option 1: Type 2 & Type 3 Indications
IAB-node
Parent node
BH RLF detected
BH RLF Recovery
BH RLF Recovered
Type 2 Indication
Type 2 Indication
Type 2 Indication
Type 2 Indication
Notice problem fixed
Option 2: Type 2 Indication repetitions

FIG. 20

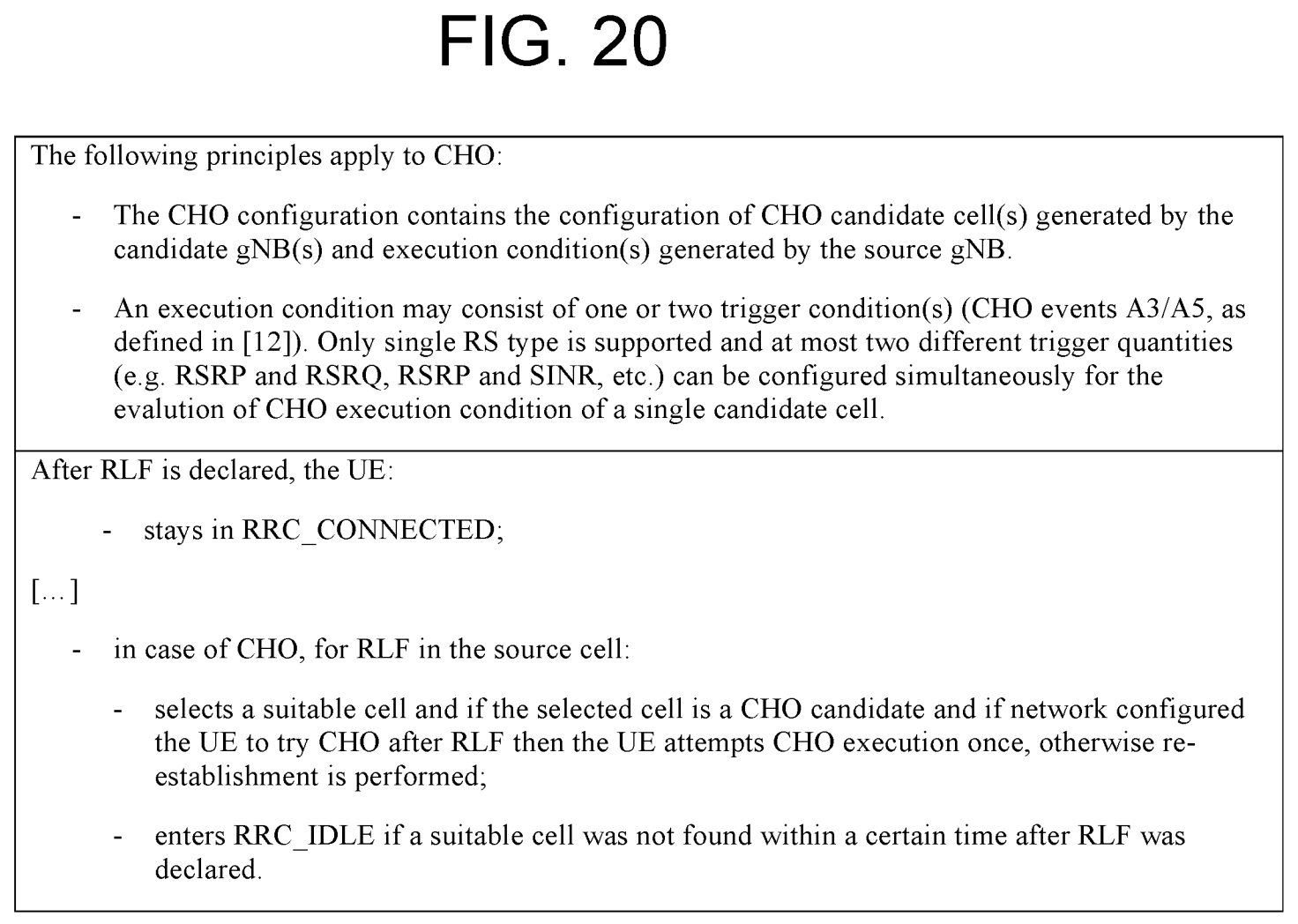

The following principles apply to CHO:

- The CHO configuration contains the configuration of CHO candidate cell(s) generated by the candidate gNB(s) and execution condition(s) generated by the source gNB.
- An execution condition may consist of one or two trigger condition(s) (CHO events A3/A5, as defined in [12]). Only single RS type is supported and at most two different trigger quantities (e.g. RSRP and RSRQ, RSRP and SINR, etc.) can be configured simultaneously for the evalution of CHO execution condition of a single candidate cell.

After RLF is declared, the UE:

- stays in RRC_CONNECTED;

[…]

- in case of CHO, for RLF in the source cell:
    - selects a suitable cell and if the selected cell is a CHO candidate and if network configured the UE to try CHO after RLF then the UE attempts CHO execution once, otherwise re-establishment is performed;
    - enters RRC_IDLE if a suitable cell was not found within a certain time after RLF was declared.

Figure 21:
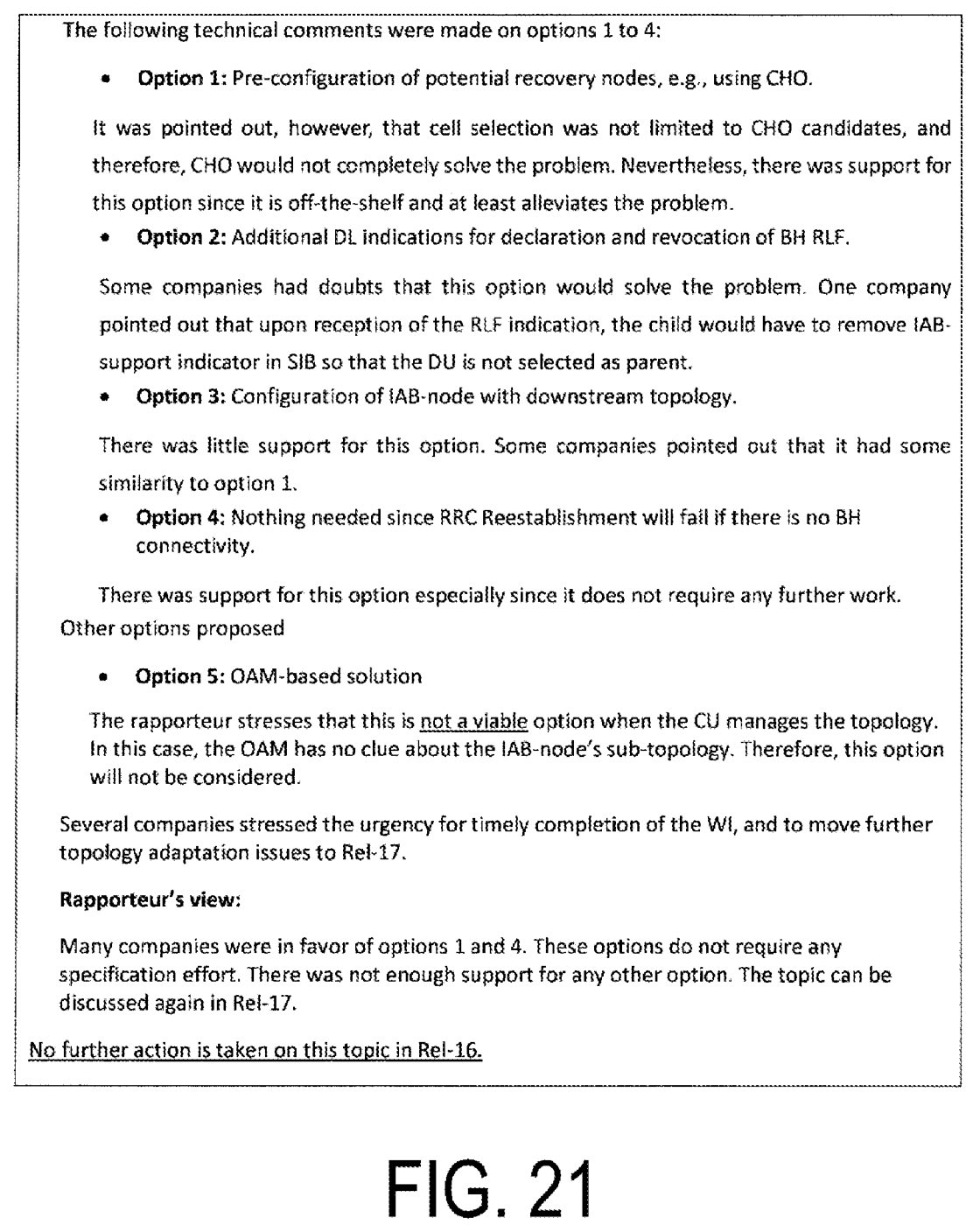

The following technical comments were made on options 1 to 4:

- Option 1: Pre-configuration of potential recovery nodes, e.g., using CHO.

It was pointed out, however, that cell selection was not limited to CHO candidates, and therefore, CHO would not completely solve the problem. Nevertheless, there was support for this option since it is off-the-shelf and at least alleviates the problem.

- Option 2: Additional DL indications for declaration and revocation of BH RLF.

Some companies had doubts that this option would solve the problem. One company pointed out that upon reception of the RLF indication, the child would have to remove IAB-support indicator in SIB so that the DU is not selected as parent.

- Option 3: Configuration of IAB-node with downstream topology.

There was little support for this option. Some companies pointed out that it had some similarity to option 1.

- Option 4: Nothing needed since RRC Reestablishment will fail if there is no BH connectivity.

There was support for this option especially since it does not require any further work.

Other options proposed

- Option 5: OAM-based solution

The rapporteur stresses that this is <u>not a viable</u> option when the CU manages the topology. In this case, the OAM has no clue about the IAB-node's sub-topology. Therefore, this option will not be considered.

Several companies stressed the urgency for timely completion of the WI, and to move further topology adaptation issues to Rel-17.

Rapporteur's view:

Many companies were in favor of options 1 and 4. These options do not require any specification effort. There was not enough support for any other option. The topic can be discussed again in Rel-17.

<u>No further action is taken on this topic in Rel-16.</u>

| | Modification of PDCP protocol/procedures | Rerouting of PDCP PDUs buffered on intermediate IAB-nodes | Introducing UL status delivery |
|---|---|---|---|
| **Applicable to Rel-15 UEs** | **No** | **Yes** | **Yes** |
| **Signaling overhead** | **Yes**<br>New signaling for triggering data retransmission | **Yes**<br>New signaling for either deciding whether to discard the buffered data or configuring the forwarding path for the buffered data on the old route. | **Yes**<br>New signaling for confirming data reception and/or triggering data retransmission. |
| **Support of lossless delivery of UL data** | **Yes** | **No** | **Yes** |

FIG. 23

| Solution | Descriptions |
|---|---|
| C-1 | Access IAB node delays the sending of RLC ACKs to UE until a confirmation of reception at IAB donor [3, 4, 7].<br><br>When PDCP data recovery / PDCP re-establishment is triggered by RRC, UE retransmits all the PDCP SDUs for which the successful delivery has not been confirmed by lower layers as in the current PDCP specification.<br><br>C-1 would need UL status report from IAB donor to access IAB node. This could be UE bearer specific due to its end to end nature. |
| C-2 | Access IAB node delays the sending of RLC ACKs to UE until a confirmation of reception at its parent node, and the parent node should also delay the sending of RLC ACKs to its child node until a confirmation of reception at its parent node, and so on [4].<br><br>When PDCP data recovery / PDCP re-establishment is triggered by RRC, UE retransmits all the PDCP SDUs for which the successful delivery has not been confirmed by lower layers as in the current PDCP specification.<br><br>C-2 would need some enhancements towards RLC ACK/NACK operation between IAB nodes, e.g. with hop by hop RLC ARQ, BH RLC channels multiplex data from many UEs, potentially being served by different downstream IAB nodes. This may lead to stalling RLC ACKs for some UEs based on data being not confirmed for other UEs. |

COMMUNICATION CONTROL METHOD USED IN A CELLULAR COMMUNICATION SYSTEM

RELATED APPLICATIONS

The present application is a continuation based on PCT Application No. PCT/JP2021/047568, filed on Dec. 22, 2021, which claims the benefit of U.S. Provisional Application No. 63/134,275 filed on Jan. 6, 2021. The content of which is incorporated by reference herein in their entirety.

TECHNICAL FIELD

The present disclosure relates to a communication control method used in a cellular communication system.

BACKGROUND OF INVENTION

In the 3GPP (Third Generation Partnership Project), which is a project for the standardization of cellular communication systems, introducing a new relay node referred to as an IAB (Integrated Access and Backhaul) node (for example, see "3GPP TS 38.300 V16.3.0 (2020-09)") is being considered. One or more relay nodes are involved in communication between a base station and a user equipment and perform relay for the communication.

SUMMARY

In a first aspect, a communication control method is used in a cellular communication system. The communication control method includes receiving, by a relay node, a flow control feedback message or a failure occurrence notification message from a parent node of the relay node. The communication control method includes executing, by the relay node, a conditional handover in response to a certain period elapsing after receiving the flow control feedback message or the failure occurrence notification message.

In a second aspect, a communication control method is used in a cellular communication system. The communication control method includes attempting, by a relay node, to transfer a data packet to a parent node of the relay node and executing, by the relay node, a conditional handover when the relay node fails to transfer the data packet for a certain period.

In a third aspect, a communication control method is used in a cellular communication system. The communication control method includes performing, by a donor base station including a first relay node under control of the donor base station, a configuration related to a conditional handover for the first relay node and executing, by the first relay node, the conditional handover based on the configuration.

BRIEF DESCRIPTION OF THE DRAWINGS

FIG. 17 is a diagram illustrating an operation example according to a sixth embodiment.

FIG. 18 is a diagram illustrating types of BH RLF notifications.

FIG. 20 is a diagram related to CHO execution.

FIG. 21 is a diagram illustrating identified solutions for avoiding reestablishment to a descendant node.

FIG. 22 is a diagram illustrating a comparison of mechanisms for lossless delivery of UL data in a hop-by-hop ARQ.

FIG. 23 is a diagram illustrating options of introduction of UL status delivery.

DESCRIPTION OF EMBODIMENTS

A cellular communication system according to an embodiment is described with reference to the drawings. In the description of the drawings, the same or similar parts are denoted by the same or similar reference signs.

Configuration of Cellular Communication System

First, a configuration example of the cellular communication system according to an embodiment will be described. In an embodiment, a cellular communication system 1 is a 3GPP 5G system. Specifically, a radio access scheme in the cellular communication system 1 is New Radio (NR) being a 5G radio access scheme. Note that Long Term Evolution (LTE) may be at least partially applied to the cellular communication system. A future cellular communication system such as 6G may be applied to the cellular communication system 1.

Figure 1:
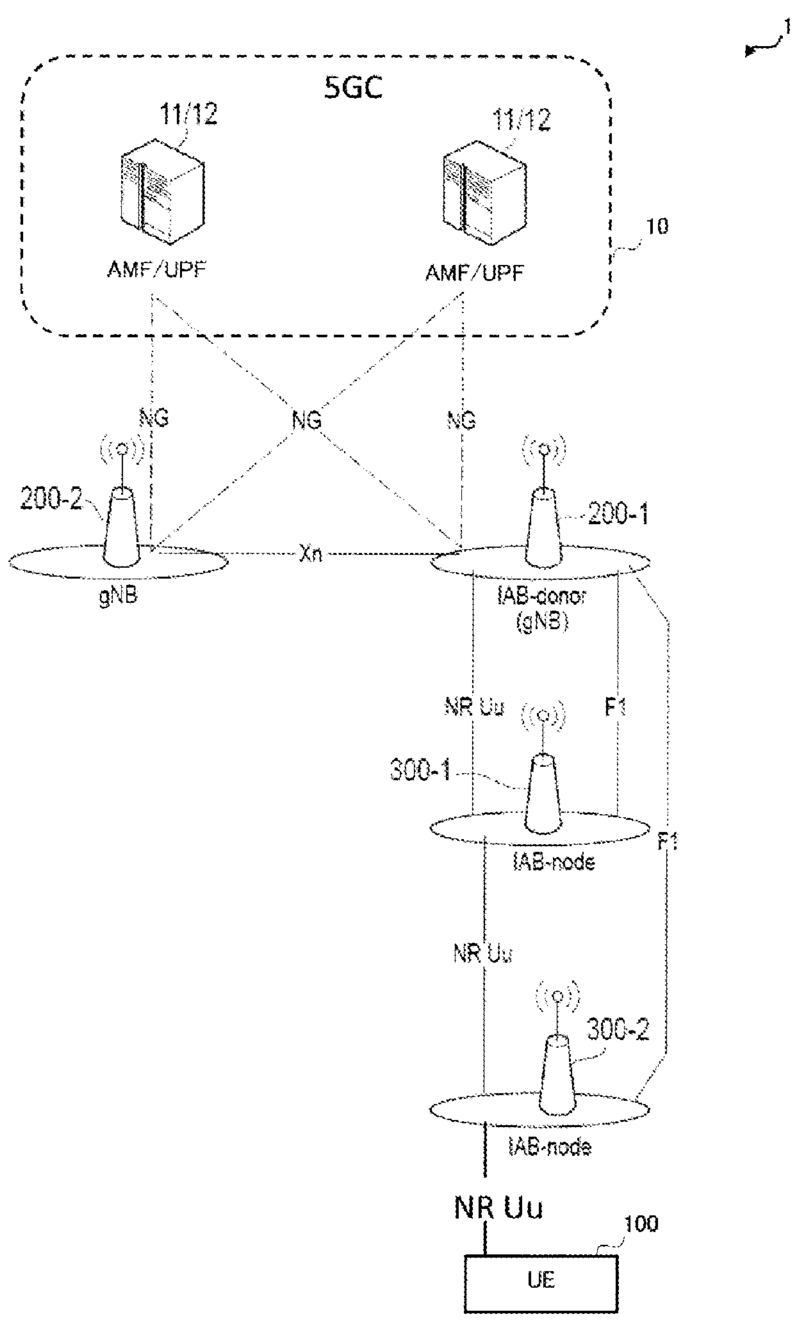
FIG. 1 is a diagram illustrating a configuration example of a cellular communication system according to an embodiment.

FIG. 1 is a diagram illustrating a configuration example of the cellular communication system 1 according to an embodiment.

As illustrated in FIG. 1, the cellular communication system 1 includes a 5G core network (5GC) 10, a User Equipment (UE) 100, base station apparatuses (hereinafter, also referred to as base stations in some cases) 200-1 and 200-2, and IAB nodes 300-1 and 300-2. The base station 200 may be referred to as a gNB.

An example in which the base station 200 is an NR base station is mainly described below, but the base station 200 may also be an LTE base station (i.e., an eNB).

Note that hereinafter, the base stations 200-1 and 200-2 may be referred to as a gNB 200 (or the base station 200 in some cases), and the IAB nodes 300-1 and 300-2 may be referred to as an IAB node 300.

The 5GC 10 includes an Access and Mobility Management Function (AMF) 11 and a User Plane Function (UPF) 12. The AMF 11 is an apparatus that performs various types of mobility controls and the like for the UE 100. The AMF 11 communicates with the UE 100 by using Non-Access Stratum (NAS) signaling, and thereby manages information of an area in which the UE 100 exists. The UPF 12 is an apparatus that performs transfer control of user data and the like.

Each gNB 200 is a fixed wireless communication node and manages one or more cells. The term "cell" is used to indicate a minimum unit of a wireless communication area. The term "cell" may be used to indicate a function or a resource for performing wireless communication with the UE 100. The cell and the base station such as the gNB 200 may be used without distinction. One cell belongs to one carrier frequency.

Each gNB 200 is interconnected to the 5GC 10 via an interface referred to as an NG interface. FIG. 1 illustrates a gNB 200-1 and a gNB 200-2 that are connected to the 5GC 10.

Each gNB 200 may be divided into a Central Unit (CU) and a Distributed Unit (DU). The CU and the DU are interconnected via an interface referred to as an F1 interface. An F1 protocol is a communication protocol between the CU and the DU and includes an F1-C protocol that is a control plane protocol and an F1-U protocol that is a user plane protocol.

The cellular communication system 1 supports an IAB that uses NR for the backhaul to enable wireless relay of the NR access. The donor gNB (or the IAB node, hereinafter also referred to as the "IAB node" in some cases) 200-1 is a donor base station that is a terminal node of the NR backhaul on the network side and includes additional functionality for supporting the IAB. The backhaul can implement multi-hop via a plurality of hops (i.e., a plurality of IAB nodes 300).

FIG. 1 illustrates an example in which the IAB node 300-1 is wirelessly connected to the IAB donor 200-1, the IAB node 300-2 is wirelessly connected to the IAB node 300-1, and the F1 protocol is transmitted via two backhaul hops.

The UE 100 is a mobile wireless communication apparatus that performs wireless communication with the cells. The UE 100 may be any type of apparatus as long as the UE 100 is an apparatus that performs wireless communication with the gNB 200 or the IAB node 300. For example, the UE 100 is a mobile phone terminal, a tablet terminal, a notebook PC, a sensor or an apparatus provided in the sensor, and/or a vehicle or an apparatus provided in the vehicle. The UE 100 is wirelessly connected to the IAB node 300 or the gNB 200 via an access link. FIG. 1 illustrates an example in which the UE 100 is wirelessly connected to the IAB node 300-2. The UE 100 indirectly communicates with the IAB donor 200-1 via the IAB node 300-2 and the IAB node 300-1.

Figure 2:
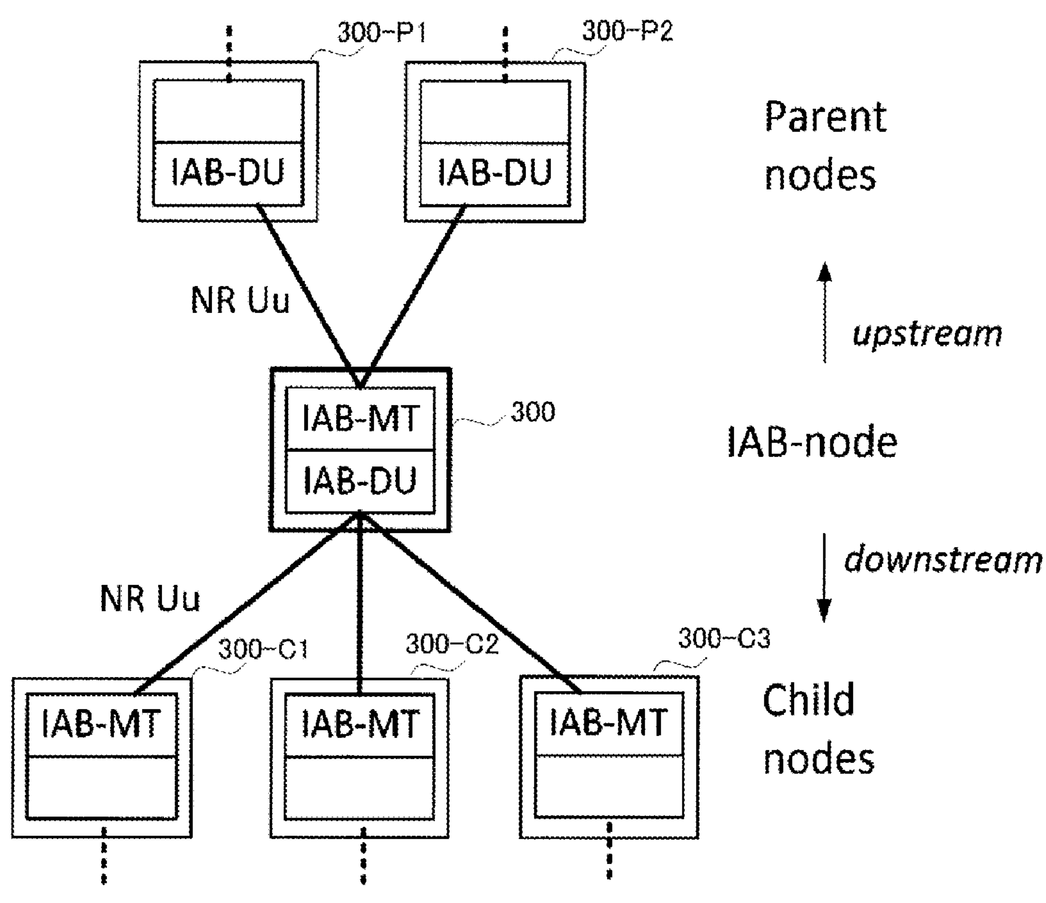
FIG. 2 is a diagram illustrating a relationship between an IAB node, Parent nodes, and Child nodes.

FIG. 2 is a diagram illustrating a relationship between the IAB node 300, Parent nodes, and Child nodes.

As illustrated in FIG. 2, each IAB node 300 includes an IAB-DU corresponding to a base station functional unit and an IAB-Mobile Termination (MT) corresponding to a user equipment functional unit.

Neighboring nodes of the IAB-MT (i.e., upper node) of an NR Uu wireless interface are referred to as "parent nodes". The parent node is the DU of a parent IAB node or the IAB donor 200. A radio link between the IAB-MT and each parent node is referred to as a backhaul link (BH link). FIG. 2 illustrates an example in which the parent nodes of the IAB node 300 are IAB nodes 300-P1 and 300-P2. Note that the direction toward the parent nodes is referred to as upstream. As viewed from the UE 100, the upper nodes of the UE 100 can correspond to the parent nodes.

Neighboring nodes of the IAB-DU (i.e., lower nodes) of an NR access interface are referred to as "child nodes". The IAB-DU manages cells in a manner the same as, and/or similar to the gNB 200. The IAB-DU terminates the NR Uu wireless interface connected to the UE 100 and the lower IAB nodes. The IAB-DU supports the F1 protocol for the CU of the IAB donor 200-1. FIG. 2 illustrates an example in which the child nodes of the IAB node 300 are IAB nodes 300-C1 to 300-C3; however, the UE 100 may be included in the child nodes of the IAB node 300. Note that the direction toward the child nodes is referred to as downstream.

All IAB nodes 300 connected to the IAB donor 200 via one or a plurality of hops form a Directed Acyclic Graph (DAG) topology (hereinafter, also referred to as a topology in some cases) rooted in the IAB donor 200. In this topology, as illustrated in FIG. 2, adjacent nodes on the interface of the IAB-DU are child nodes, and adjacent nodes on the interface of the IAB-MT are parent nodes. The IAB donor 200 performs centralized resource, topology, route management, etc., of the IAB topology, for example.

Configuration of Base Station

Figure 3:
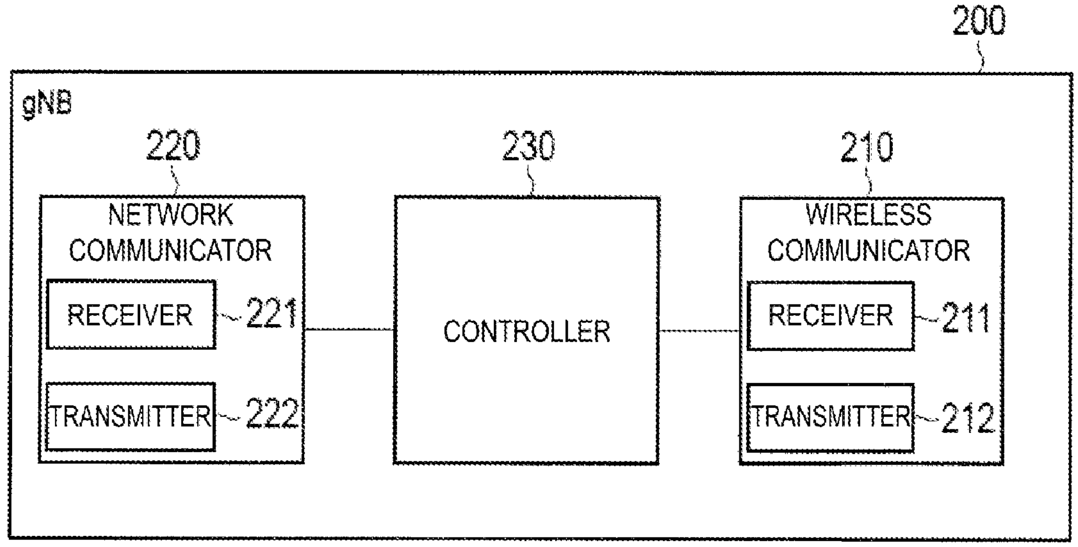
FIG. 3 is a diagram illustrating a configuration example of a gNB (base station) according to an embodiment.

A configuration of the gNB 200 that is a base station according to the embodiment is described. FIG. 3 is a diagram illustrating a configuration example of the gNB 200. As illustrated in FIG. 3, the gNB 200 includes a wireless communicator 210, a network communicator 220, and a controller 230.

The wireless communicator 210 performs wireless communication with the UE 100 and performs wireless communication with the IAB node 300. The wireless communicator 210 includes a receiver 211 and a transmitter 212. The receiver 211 performs various types of reception under control of the controller 230. The receiver 211 includes an antenna and converts (down-converts) a radio signal received by the antenna into a baseband signal (reception signal) which is then transmitted to the controller 230. The transmitter 212 performs various types of transmission under control of the controller 230. The transmitter 212 includes an antenna and converts (up-converts) the baseband signal (transmission signal) output by the controller 230 into a radio signal which is then transmitted from the antenna.

The network communicator 220 performs wired communication (or wireless communication) with the 5GC 10 and performs wired communication (or wireless communication) with another neighboring gNB 200. The network communicator 220 includes a receiver 221 and a transmitter 222. The receiver 221 performs various types of reception under control of the controller 230. The receiver 221 receives a signal from an external source and outputs the reception signal to the controller 230. The transmitter 222 performs various types of transmission under control of the controller 230. The transmitter 222 transmits the transmission signal output by the controller 230 to an external destination.

The controller 230 performs various types of controls for the gNB 200. The controller 230 includes at least one memory and at least one processor electrically connected to the memory. The memory stores a program to be executed by the processor and information to be used for processing by the processor. The processor may include a baseband processor and a Central Processing Unit (CPU). The baseband processor performs modulation and demodulation, coding and decoding, and the like of a baseband signal. The CPU executes the program stored in the memory to thereby perform various types of processing. The processor performs processing of the layers described below. In each example described below, the controller 230 may perform each processing operation in the gNB 200.

Configuration of Relay Node

Figure 4:
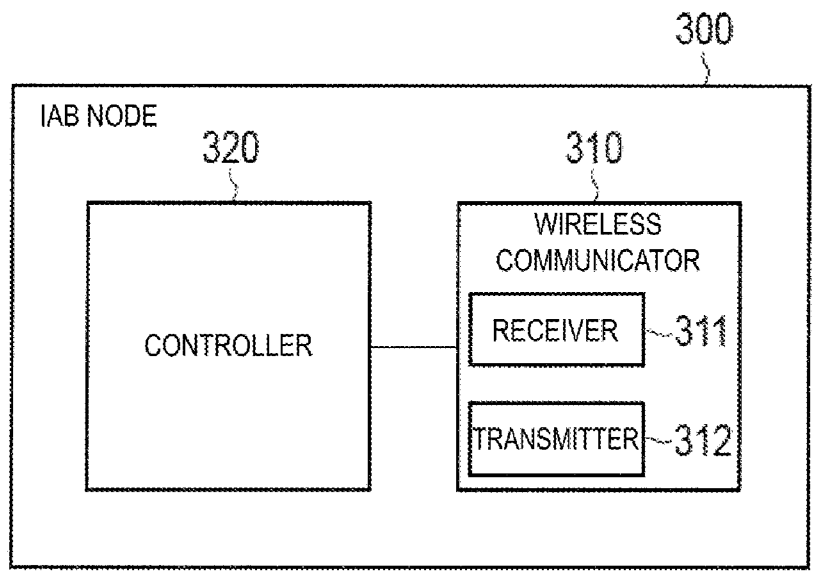
FIG. 4 is a diagram illustrating a configuration example of an IAB node (relay node) according to an embodiment.

A configuration of the IAB node 300 that is a relay node (or a relay node apparatus, which is also referred to as a relay node below in some cases) according to the embodiment is described. FIG. 4 is a diagram illustrating a configuration example of the IAB node 300. As illustrated in FIG. 4, the IAB node 300 includes a wireless communicator 310 and a controller 320. The IAB node 300 may include a plurality of wireless communicators 310.

The wireless communicator 310 performs wireless communication with the gNB 200 (BH link) and wireless communication with the UE 100 (access link). The wireless communicator 310 for the BH link communication and the wireless communicator 310 for the access link communication may be provided separately.

The wireless communicator 310 includes a receiver 311 and a transmitter 312. The receiver 311 performs various types of reception under control of the controller 320. The receiver 311 includes an antenna and converts (down-converts) a radio signal received by the antenna into a baseband signal (reception signal) which is then transmitted to the controller 320. The transmitter 312 performs various types of transmission under control of the controller 320. The transmitter 312 includes an antenna and converts (up-converts) the baseband signal (transmission signal) output by the controller 320 into a radio signal which is then transmitted from the antenna.

The controller 320 performs various types of controls in the IAB node 300. The controller 320 includes at least one memory and at least one processor electrically connected to the memory. The memory stores a program to be executed by the processor and information to be used for processing by the processor. The processor may include a baseband processor and a CPU. The baseband processor performs modulation and demodulation, coding and decoding, and the like of a baseband signal. The CPU executes the program stored in the memory to thereby perform various types of processing. The processor performs processing of the layers described below. In each example described below, the controller 320 may perform each processing operation in the IAB node 300.

Configuration of User Equipment

Figure 5:
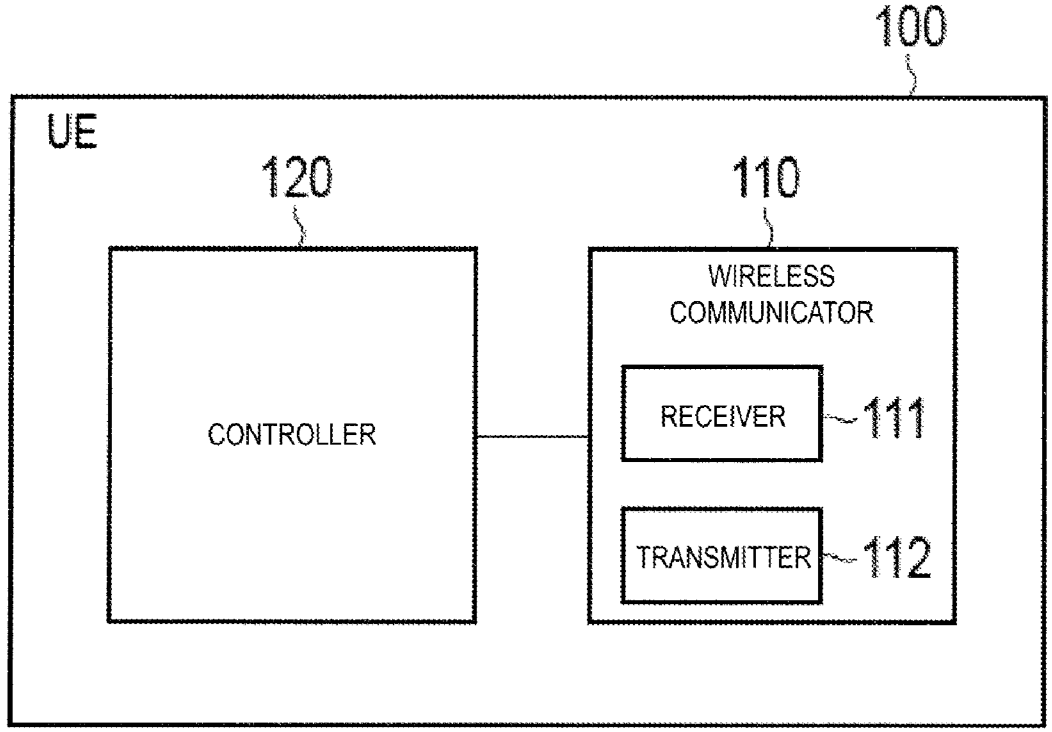
FIG. 5 is a diagram illustrating a configuration example of a UE (user equipment) according to an embodiment.

A configuration of the UE 100 that is a user equipment according to the embodiment is described next. FIG. 5 is a diagram illustrating a configuration example of the UE 100. As illustrated in FIG. 5, the UE 100 includes a wireless communicator 110 and a controller 120.

The wireless communicator 110 performs wireless communication in the access link, i.e., wireless communication with the gNB 200 and wireless communication with the IAB node 300. The wireless communicator 110 may also perform wireless communication in a sidelink, i.e., wireless communication with another UE 100. The wireless communicator 110 includes a receiver 111 and a transmitter 112. The receiver 111 performs various types of reception under control of the controller 120. The receiver 111 includes an antenna and converts (down-converts) a radio signal received by the antenna into a baseband signal (reception signal) which is then transmitted to the controller 120. The transmitter 112 performs various types of transmission under control of the controller 120. The transmitter 112 includes an antenna and converts (up-converts) the baseband signal (transmission signal) output by the controller 120 into a radio signal which is then transmitted from the antenna.

The controller 120 performs various types of control in the UE 100. The controller 120 includes at least one memory and at least one processor electrically connected to the memory. The memory stores a program to be executed by the processor and information to be used for processing by the processor. The processor may include a baseband processor and a CPU. The baseband processor performs modulation and demodulation, coding and decoding, and the like of a baseband signal. The CPU executes the program stored in the memory to thereby perform various types of processing. The processor performs processing of the layers described below. In each example described below, the controller 130 may perform each processing operation in the UE 100.

Configuration of Protocol Stack

Figure 6:
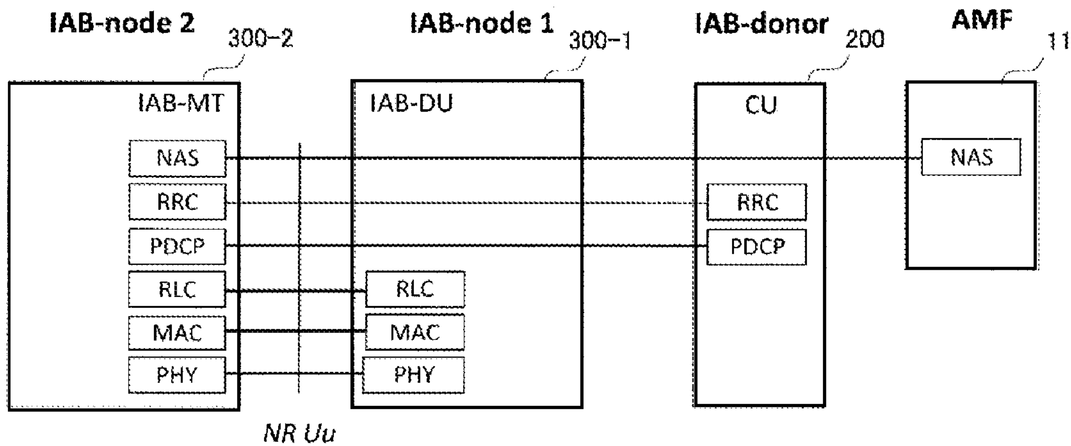
FIG. 6 is a diagram illustrating an example of a protocol stack related to an RRC connection and a NAS connection of an IAB-MT.

A configuration of a protocol stack according to the embodiment is described next. FIG. 6 is a diagram illustrating an example of a protocol stack related to an RRC connection and a NAS connection of the IAB-MT.

As illustrated in FIG. 6, the IAB-MT of the IAB node 300-2 includes a physical (PHY) layer, a Medium Access Control (MAC) layer, a Radio Link Control (RLC) layer, a Packet Data Convergence Protocol (PDCP) layer, a Radio Resource Control (RRC) layer, and a Non-Access Stratum (NAS) layer.

The PHY layer performs coding and decoding, modulation and demodulation, antenna mapping and demapping, and resource mapping and demapping. Data and control information are transmitted between the PHY layer of the IAB-MT of the IAB node 300-2 and the PHY layer of the IAB-DU of the IAB node 300-1 via a physical channel.

The MAC layer performs priority control of data, retransmission processing through hybrid ARQ (HARQ: Hybrid Automatic Repeat reQuest), a random access procedure, and the like. Data and control information are transmitted between the MAC layer of the IAB-MT of the IAB node 300-2 and the MAC layer of the IAB-DU of the IAB node 300-1 via a transport channel. The MAC layer of the IAB-DU includes a scheduler. The scheduler determines the transport format (transport block size, modulation and coding scheme (MCS)) and the assignment of resource blocks in the uplink and the downlink.

The RLC layer transmits data to the RLC layer on the reception side by using functions of the MAC layer and the PHY layer. Data and control information are transmitted between the RLC layer of the IAB-MT of the IAB node 300-2 and the RLC layer of the IAB-DU of the IAB node 300-1 via a logical channel.

The PDCP layer performs header compression and decompression, and encryption and decryption. Data and control information are transmitted between the PDCP layer of the IAB-MT of the IAB node 300-2 and the PDCP layer of the IAB donor 200 via a radio bearer.

The RRC layer controls a logical channel, a transport channel, and a physical channel according to establishment, reestablishment, and release of a radio bearer. RRC signaling for various configurations is transmitted between the RRC layer of the IAB-MT of the IAB node 300-2 and the RRC layer of the IAB donor 200. When an RRC connection to the IAB donor 200 is present, the IAB-MT is in an RRC connected state. When no RRC connection to the IAB donor 200 is present, the IAB-MT is in an RRC idle state.

The NAS layer which is higher than the RRC layer performs session management, mobility management, and the like. NAS signaling is transmitted between the NAS layer of the IAB-MT of the IAB node 300-2 and the AMF 11.

Figure 7:
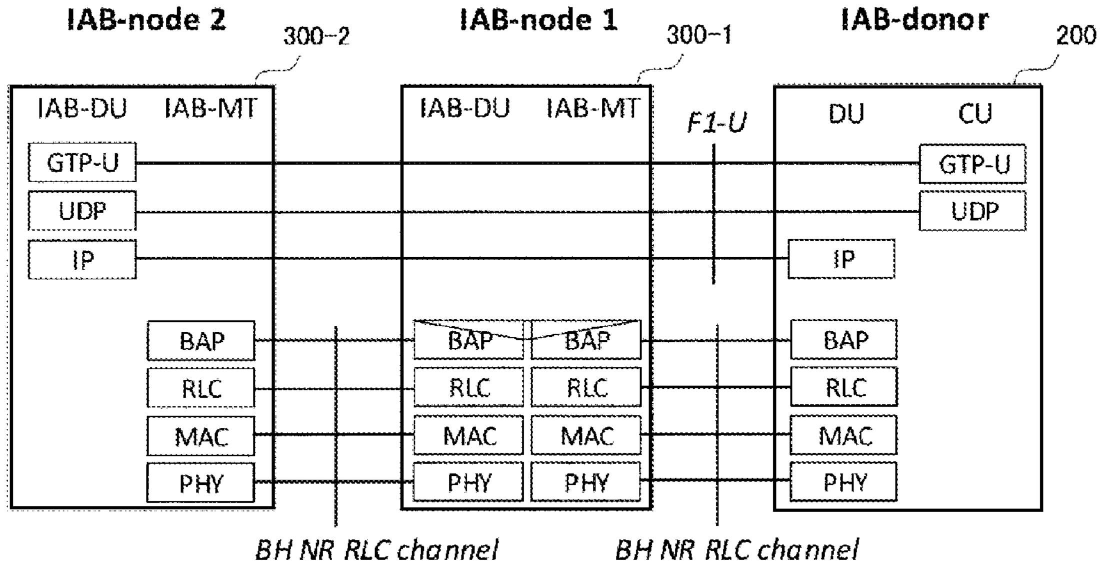
FIG. 7 is a diagram illustrating an example of a protocol stack related to an F1-U protocol.
Figure 8:
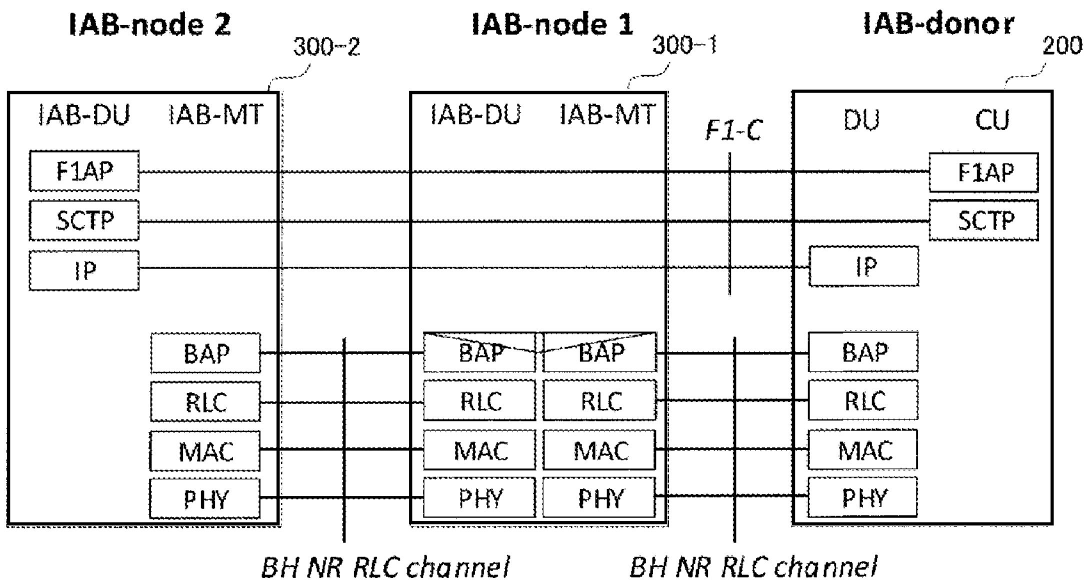
FIG. 8 is a diagram illustrating an example of a protocol stack related to an F1-C protocol.

FIG. 7 is a diagram illustrating a protocol stack related to an F1-U protocol. FIG. 8 is a diagram illustrating a protocol stack related to an F1-C protocol. An example in which the IAB donor 200 is divided into the CU and the DU is illustrated here.

As illustrated in FIG. 7, each of the IAB-MT of the IAB node 300-2, the IAB-DU of the IAB node 300-1, the IAB-MT of the IAB node 300-1, and the DU of the IAB donor 200 includes a Backhaul Adaptation Protocol (BAP) layer as a higher layer than the RLC layer. The BAP layer performs routing processing, and bearer mapping and demapping processing. In the backhaul, the IP layer is transmitted via the BAP layer to allow routing through a plurality of hops.

In each backhaul link, a Protocol Data Unit (PDU) of the BAP layer is transmitted by the backhaul RLC channel (BH NR RLC channel). Each BH link include multiple backhaul RLC channels. This enables the prioritization and Quality of Service (QoS) control of traffic. The association between the BAP PDU and the backhaul RLC channel is performed by the BAP layer of each IAB node 300 and the BAP layer of the IAB donor 200.

Note that the CU of the IAB donor 200 is a gNB-CU function of the IAB donor 200 that terminates the F1 interface to the IAB node 300 and the DU of the IAB donor 200. The DU of the IAB donor 200 is a gNB-DU function of the IAB donor 200 that hosts an IAB BAP sublayer and provides a wireless backhaul to the IAB node 300.

As illustrated in FIG. 8, the protocol stack of the F1-C protocol includes an F1AP layer and a Stream Control Transmission Protocol (SCTP) layer, instead of a GTP-U layer and a UDP layer illustrated in FIG. 7.

Note that in the description below, processing or operation performed by the IAB-DU and the IAB-MT of the IAB may be simply described as processing or operation of the "IAB". For example, in the description, transmitting, by the IAB-DU of the IAB node 300-1, a message of the BAP layer to the IAB-MT of the IAB node 300-2 is assumed to correspond to transmitting, by the IAB node 300-1, the message to the IAB node 300-2. Processing or operation of the DU or CU of the IAB donor 200 may be described simply as processing or operation of the "IAB donor".

An upstream direction and an uplink (UL) direction may be used without distinction. A downstream direction and a downlink (DL) direction may be used without distinction.

First Embodiment

In the cellular communication system 1, a conditional handover may be executed. The conditional handover (CHO) is a handover executed when one or more execution conditions (or trigger conditions) are satisfied. The conditional handover will be described.

Conditional Handover

In a typical handover, the UE 100 reports, to the gNB 200, the measured value of the radio state of the serving cell and/or a neighbor cell, and based on this report, the gNB 200 determines the handover to the neighbor cell and transmits a handover instruction to the UE 100. Accordingly, when the radio state of the serving cell is rapidly degraded, in the typical handover, communication breakdown may occur before the handover is performed.

In contrast, in the conditional handover, when a preconfigured trigger condition is satisfied, a handover to the candidate cell corresponding to the trigger condition can autonomously be performed. Accordingly, problems with the typical handover such as communication disruption can be solved.

The execution condition for the conditional handover includes one or more trigger conditions. Configuration of the conditional handover includes a candidate cell and a trigger condition. The configuration of the conditional handover may include pluralities of combinations of a candidate cell and a trigger condition. The configuration of the conditional handover may be performed by unicast signaling (for example, an RRC Reconfiguration message or the like) from the CU of the IAB donor 200 to the IAB-DU of the IAB node 300 and the UE 100, for example.

Figure 9:
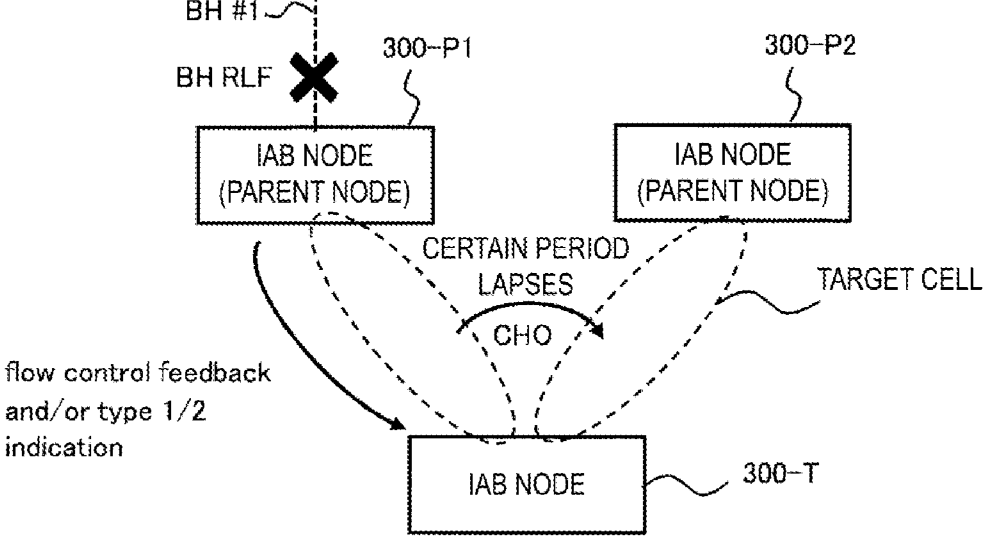
FIG. 9 is a diagram illustrating an example in which a conditional handover is executed.

FIG. 9 is a diagram illustrating an example in which a conditional handover is executed. As illustrated in FIG. 9, an IAB node 300-T is in an RRC connected state with respect to the IAB node 300-P1 that is a parent node of the IAB node 300-T. When the IAB-MT of the IAB node 300-T determines that the trigger condition is satisfied, a conditional handover is executed from the serving cell (or the IAB node 300-P1 managing the serving cell) to a target cell (or the IAB node 300-P2 managing the target cell).

Figure 10:
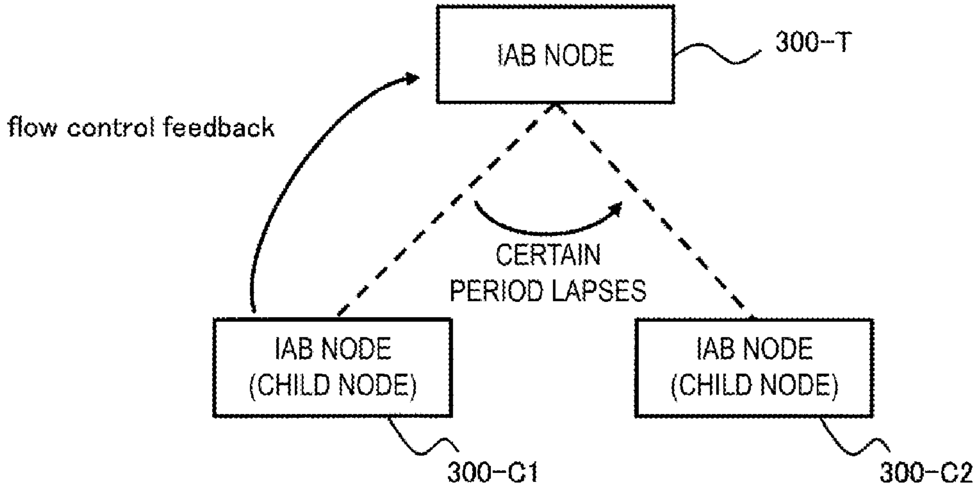
FIG. 10 is a diagram illustrating an example in which a conditional handover is executed.

Note that as illustrate in FIG. 10, when a flow control feedback message is received from the child node 300-C1 in the downstream direction of the IAB node 300-T, local rerouting is performed to switch a path. Note that details of the flow control feedback message will be described below.

Note that hereinafter, the cell and the IAB node 300 managing the cell may be used without distinction. Therefore, the handover from the serving cell to the target cell and handover from the IAB node 300-P1 managing the serving cell to the IAB node 300-P2 managing the target cell may be used in the same meaning.

In the IAB node 300-T, when the trigger condition is satisfied, if the conditional handover is executed immediately, the handover may be executed even though a situation is improved. Such conditional handover results in an unnecessary handover. Such an unnecessary handover may cause the entire topology to be in a non-optimal state.

In the first embodiment, when the trigger condition is satisfied, the conditional handover is executed after a certain period elapses after a predetermined message is received rather than immediately executed. In other words, the trigger condition in the first embodiment is "a certain period elapsing after a predetermined message is received".

Specifically, first, a relay node (e.g., the IAB node 300-T) receives a flow control feedback message or a failure occurrence notification message from a parent node of the relay node. Second, the relay node executes a conditional handover in response to a certain period elapsing after receiving the flow control feedback message or the failure occurrence notification message.

In other words, the "predetermined message" may be "the flow control feedback message or the failure occurrence notification message".

In the first embodiment, since the conditional handover is executed after a certain period elapses after a predetermined message is received in the IAB node 300-T, the conditional handover may not be executed when the situation is improved. Therefore, in the first embodiment, the unnecessary conditional handover execution is suppressed, and the entire topology can be maintained in an optimum state.

Here, the "flow control feedback message" is a message used in flow control. The "failure occurrence notification message" is a notification message used when a failure occurs in the BH link. Here, two kinds of messages will be described.

Flow Control Feedback Message

In the cellular communication system 1, the flow control may be performed. The flow control can avoid congestion (or being crowded, hereinafter, also referred to as "crowding" in some cases) associated with packet drops in the IAB node 300 and the IAB donor 200.

The flow control in the downstream direction in the 3GPP is supported in the BAP sublayer. The IAB-MT of the IAB node 300 transmits feedback information related to a buffer size available in each ingress (inflow) BH RLC channel to the parent node when a buffer size exceeds a certain volume or upon receiving a flow control polling. A message including this feedback information is a flow control feedback message.

The flow control in the upstream direction is not specifically defined in the 3GPP. In this case, in the 3GPP, the control is performed by UL scheduling (or UL grant) on the MAC layer depending on the implementation. In the first embodiment, as illustrated in FIG. 9, the IAB-DU of the parent node 300-P1 can transmit a flow control feedback message to the IAB-MT of the IAB node 300-T that is a child node of the node 300-P1.

The flow control feedback message may be included in a BAP layer message, e.g., a BAP Control PDU. Alternatively, the flow control feedback message may be transmitted by using a MAC CE or an RRC message.

However, in FIG. 9, assume when the IAB node 300-T is replaced with the UE 100. The UE 100 does not support the BAP layer. The IAB node 300-P1 transmits the flow control feedback message included in a System Information Block Type 1 (SIB 1) to the UE 100 or transmits the flow control feedback message to the UE 100 by using the MAC CE. This allows the IAB node 300-P1 to transmit the flow control feedback message to the UE 100.

Failure Occurrence Notification Message

As illustrated in FIG. 9, the IAB node 300-P1 has established a backhaul (BH #1) link with an upper IAB node of the IAB node 300-P1. The IAB-MT of the IAB node 300-P1 is in the RRC connected state.

Assume that the IAB-MT of the IAB node 300-P1 detects a radio link failure in the BH #1 link (Backhaul Radio Link Failure (BH RLF)). For example, the IAB-MT of the IAB node 300-P1 detects the BH RLF, for example, by detecting an out of synchronization state (out-of-sync) under a certain condition. The IAB-DU of the IAB node 300-P1, when detecting the BH RLF, can notify Type 1 Indication (RLF detected) to the IAB node 300-T (or the UE 100). The Type 1 Indication is an example of a failure occurrence notification indicating the detection of a BH RLF. The IAB-DU of the IAB node 300-P1, when detecting an operation of recovering from the BH RLF, can notify Type 2 Indication (Trying to recover) to the IAB-MT of the IAB node 300-T (or the UE 100). The Type 2 Indication is an example of a failure occurrence notification indicating that the recovery from the BH RLF is being attempted. When not distinguishing between the Type 1 Indication and the Type 2 Indication, the IAB-DU of the IAB node 300-P1 can transmit Type 1/2 Indication to the IAB-MT of the IAB node 300-T (or the UE 100). The Type 1/2 Indication is also an example of the failure occurrence notification.

A message including such a failure occurrence notification is a failure occurrence notification message. The failure occurrence notification message may also be included in a BAP layer message, e.g., a BAP Control PDU. However, in FIG. 9, assume when the IAB node 300-T is replaced with the UE 100. Also in this case, the IAB node 300-P1 can transmit the failure occurrence notification message to the UE 100 by transmitting the failure occurrence notification message included in the SIB 1 to the UE 100, or by transmitting the failure occurrence notification message to the UE 100 using the MAC CE.

Note that types of notification include Type 3 Indication (RLF recovered) and Type 4 Indication (Recovery failure). The Type 3 Indication is a recovery notification indicating that the IAB node 300-T has recovered from the BH RLF. The Type 4 Indication is an example of a recovery failure notification indicating that the IAB node 300-T has failed in recovery from the BH RLF.

Operation Example

An operation example in the first embodiment will be described.

Figure 11:
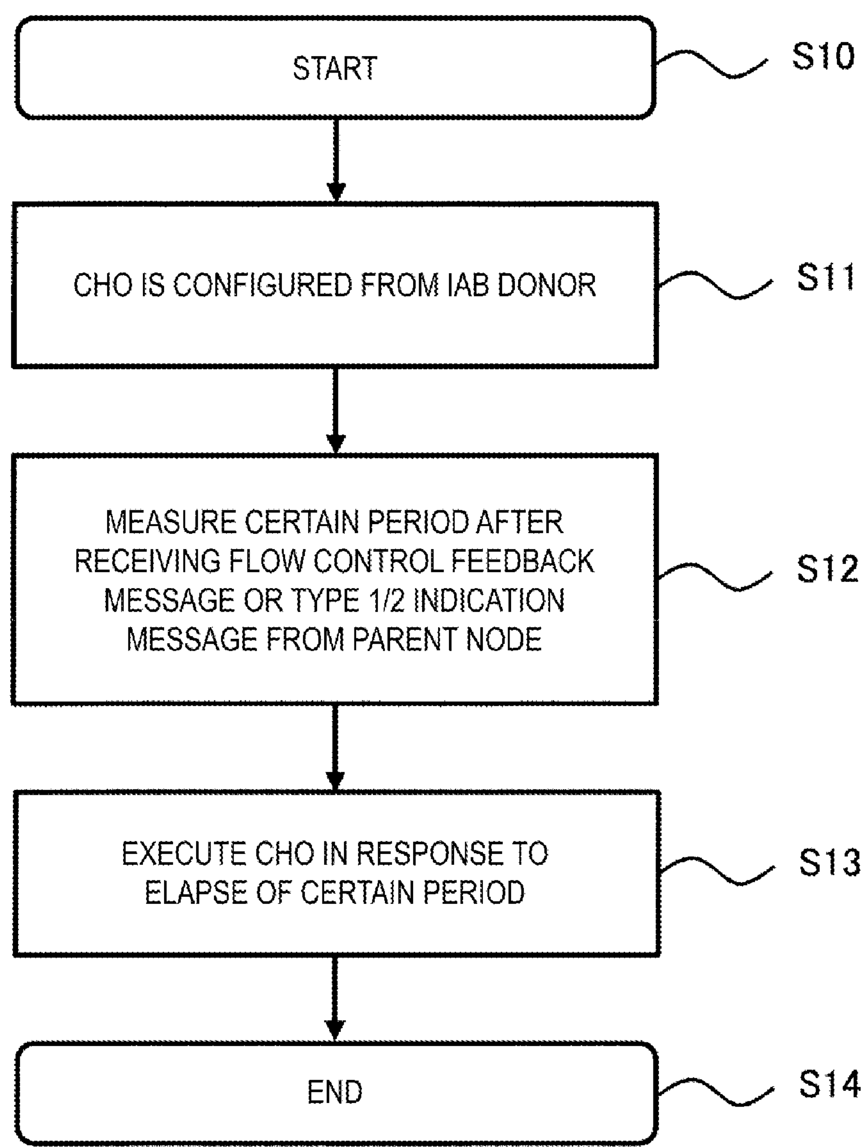
FIG. 11 is a diagram illustrating an operation example according to a first embodiment.

FIG. 11 is a diagram illustrating an operation example according to the first embodiment.

The IAB node 300-T starts processing in step S10, and then, is configured with a conditional handover by the IAB donor 200 in step S11.

In step S12, the IAB node 300-T measures a certain period after receiving a flow control feedback message or a failure occurrence notification message from the parent node 300-P1. The failure occurrence notification message is the Type 1 Indication, Type 2 Indication, or Type 1/2 Indication of the BH RLF. The certain period starts at the reception of the flow control feedback message or the failure occurrence notification message. In this case, the IAB node 300-T starts a timer, and when a count value reaches a timer value, the IAB node 300-T determines that the certain period expires. The timer value may be set in advance in the IAB node 300-T from the IAB donor 200 or the parent node 300-P1. Alternatively, the timer value may be included in the flow control feedback message or the failure occurrence notification message. The number of times the flow control feedback message is received may be used for the certain period. In other words, the IAB node 300-T increments the counter upon receiving the flow control feedback message from the parent node 300-P1 or the child node 300-C1. When the counter value reaches a threshold, the IAB node 300-T determines that the certain period elapses. The threshold may be preset by the IAB donor 200 or the parent node 300-P1 or may be included in the flow control feedback message. Alternatively, the determination with the timer and the determination with the counter may be combined. Specifically, the IAB node 300-T starts the timer when first receiving the flow control feedback message, and increments the counter. When the counter value reaches the threshold before the timer expires, the IAB node 300-T determines that the certain period elapses. When the timer expires, the IAB node 300-T resets the counter value (i.e., sets to 0).

In step S13, the IAB node 300-T executes the conditional handover in response to the certain period elapsing. In the example of FIG. 9, the IAB node 300-T executes the conditional handover to the IAB node 300-P2 that manages the target cell.

In step S14, the IAB node 300-T terminates a series of processing operations.

Note that, in the first embodiment, determination on executing the conditional handover may be performed in response to a demand from the parent node 300-P1 or the child node 300-C1, instead of measuring the certain period. For example, the parent node 300-P1 or the child node 300-C1 includes in the flow control feedback message an identifier indicating whether a conditional handover is to be performed. The IAB node 300-T determines whether to perform the conditional handover according to the identifier. Thus, the parent node 300-P1 or the child node 300-C1 can control the conditional handover of the IAB node 300-T in accordance with the crowding situation.

The IAB node 300-T may be configured not to execute the conditional handover when the IAB node 300-T receives the predetermined message before the certain period elapses in step S13. The predetermined message may include a flow control leaving feedback message. The flow control leaving feedback message is, for example, a message used to notify that the parent node 300-P1 having been in the crowding situation and transmitted the flow control feedback message is improved from the crowding situation and returns to a normal state. The predetermined message includes the Type 3 Indication of the BH RLF. The IAB node 300-T receiving such a predetermined message may stop the timer.

Second Embodiment

A second embodiment is an example in which a conditional handover is executed when the IAB node 300 fails to transfer a data packet for a certain period.

Specifically, first, a relay node (e.g., the IAB node 300) attempts to transfer a data packet a parent node of the relay node. Second, the relay node executes a conditional handover when the relay node fails to transfer the data packet for a certain period.

In the second embodiment, the trigger condition for the conditional handover is "the data packet failing to be transferred to the parent node for a certain period".

In the example of FIG. 9, the IAB-MT of the IAB node 300-T attempts to transfer a data packet to the IAB-DU of the parent node 300-P1. Then, the IAB-MT of the IAB node 300-T executes, when failing to transfer that for a certain period, the conditional handover to the IAB node 300-P2 that manages the target cell.

As described above, in the IAB node 300, the conditional handover is executed when the data packet fails to be transferred for a certain period. For example, the IAB node 300 can give up the IAB node managing the serving cell and execute the conditional handover to another IAB node. Therefore, in the second embodiment, the delay of the data packet transfer can be reduced.

An operation example in the second embodiment will be described.

Figure 12:
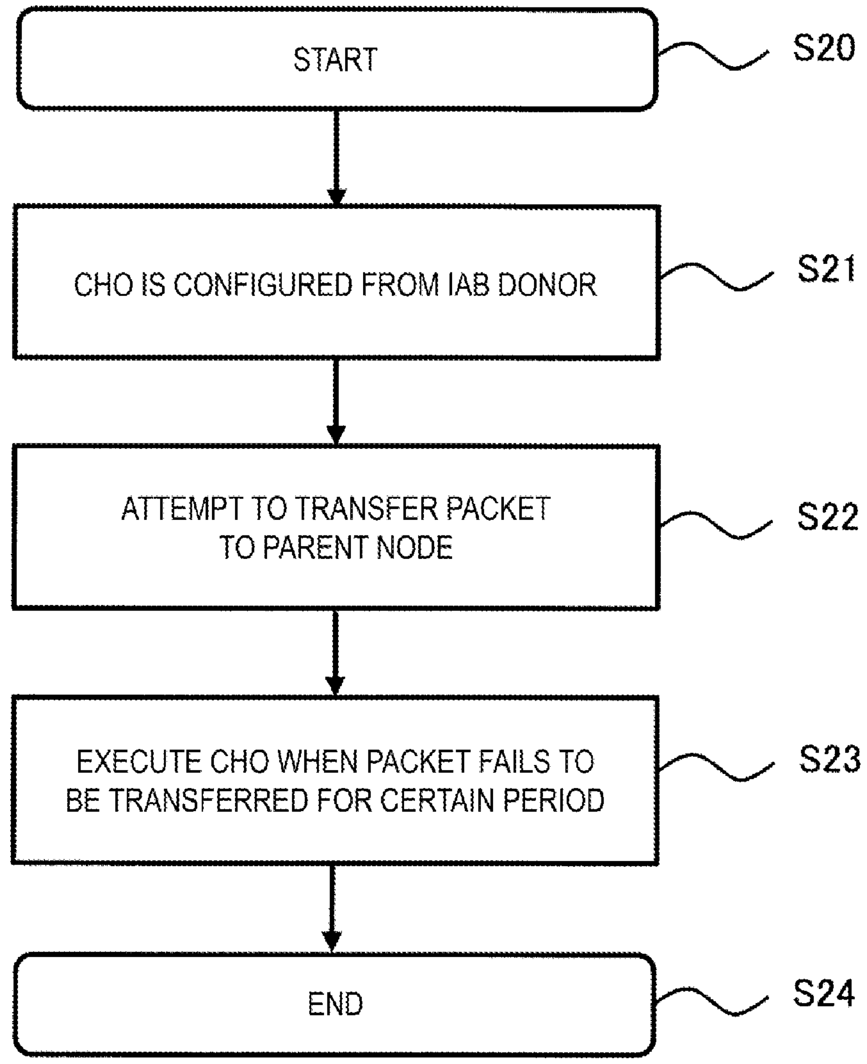
FIG. 12 is a diagram illustrating an operation example according to a second embodiment.

FIG. 12 is a diagram illustrating the operation example according to the second embodiment.

The IAB node 300-T starts processing in step S20, and then, is configured with a conditional handover by the IAB donor 200 in step S21.

At step S22, the IAB node 300-T attempts to transfer a data packet to the parent node 300-P1.

In step S23, the IAB node 300-T executes a conditional handover when the data packet fails to be transferred for a certain period. Here, examples of "the data packet failing to be transferred for a certain period" include the following.

(A1) An example of "the data packet failing to be transferred for a certain period" is that the IAB node 300-T does not receive a UL grant from the parent node 300-P1 even if the IAB node 300-T transmits Scheduling Requests (SRs) to the parent node 300-P1 a certain number of times.

(A2) Alternatively, an example of "the data packet failing to be transferred for a certain period" is that the IAB node 300-T does not receive a UL grant for a certain time period after transmitting an SR or a buffer status report (BSR) to the parent node 300-P1.

(A3) Alternatively, an example of "the data packet failing to be transferred for a certain period" is that the number of HARQ or RLC retransmissions of the IAB node 300-T to the parent node 300-P1 reaches a certain number of times. However, in this case, when the number of HARQ or RLC retransmissions reaches a certain number of times is desirably before a BH RLF occurs. In particular, in the case of RLC retransmission, a threshold of the certain number of times is desirably smaller than a threshold for determining a BH RLF due to an RLC retransmission failure.

(A4) Alternatively, an example of "the data packet failing to be transferred for a certain period" is that the IAB node 300-T fails to transfer the data packet to the parent node 300-P1 for a certain time period (i.e., the data packet is retained) after receiving the data packet from the child node 300-C1.

(A5) Alternatively, an example of "the data packet failing to be transferred for a certain period" is that a certain time period elapses after the IAB node 300-T detects a radio problem with the parent node 300-P1 (without recovering from the radio problem). However, in this case, a threshold of the certain time period is desirably smaller (shorter) than a threshold for determining a BH RLF due to the radio problem.

(A6) Alternatively, an example of "the data packet failing to be transferred for a certain period" is that a certain time period elapses after the IAB node 300-T triggers a radio measurement report to the parent node 300-P1 (without transmitting the radio measurement report). However, in this case, a threshold of the certain time period is desirably smaller (shorter) than a threshold for determining a BH RLF due to the radio measurement report.

(A7) Alternatively, an example of "the data packet failing to be transferred for a certain period" is that the number of transmissions (retransmissions) of a random access preamble to the parent node 300-P1 by the IAB node 300-T reaches a certain number of times (without successful transmission of the random access preamble). However, in this case, a threshold of the certain number of times is desirably smaller than a threshold for determining a BH RLF due to the random access procedure failure.

(A8) Alternatively, an example of "the data packet failing to be transferred for a certain period" is that the number of times of Listen-Before-Talk (LBT) of the IAB node 300-T to the parent node 300-P1 reaches a certain number of times within a certain time period. However, in this case, a threshold of the certain number of times is desirably smaller than a threshold for determining a BH RLF due to continuous LBT failures (consistent LBT failures). The certain time period may be larger (longer) than a threshold for determining a BH RLF due to continuous LBT failures (consistent LBT failures).

Note that the "certain number of times" and the "certain time period" in (A1) to (A8) may be configured by the parent node 300-P1 or the IAB donor 200. The IAB node 300-T may measure the "certain time period" using an internal timer. The "certain number of times", the "certain time period", and the timer may exist or be measured separately for each BH RLC channel, for each Logical Channel Group (LCG), for each source and/or destination, or for each routing ID.

In step S24, the IAB node 300-T terminates a series of processing operations.

Third Embodiment

A third embodiment is an example in which the IAB node 300 executes a conditional handover when the IAB node 300 receives a flow control feedback message and further receives a failure occurrence notification message, from the parent node of the IAB node 300.

Specifically, a relay node (e.g., the IAB node 300) executes a conditional handover in response to receiving a flow control feedback message from a parent node, and further receiving a failure occurrence notification message from the parent node, without a certain period elapsing.

In the third embodiment, the trigger condition for the conditional handover is "receiving the flow control feedback message from the parent node and further receiving the failure occurrence notification message from the parent node".

Thus, for example, the IAB node 300 is handed over to a parent node different from a parent node which has transmitted the flow control message, thereby improving the "crowding" situation in the parent node. For example, since the IAB node 300 is handed over to a parent node different from a parent node which is in the "crowding" situation and in which a BH RLF occurs, the delay of data packet transfer in the upstream direction can be also reduced.

An operation example in the third embodiment will be described.

Figure 13:
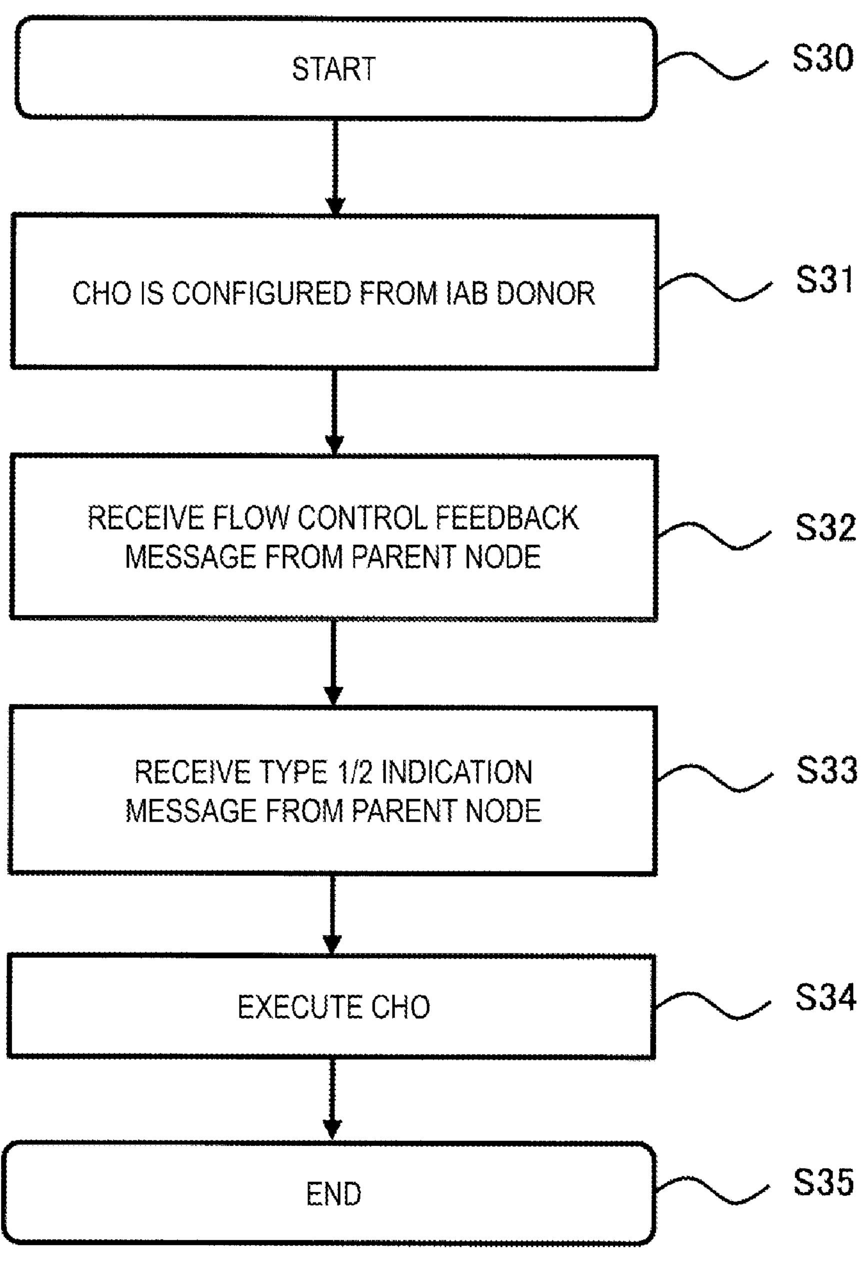
FIG. 13 is a diagram illustrating an operation example according to a third embodiment.

FIG. 13 is a diagram illustrating the operation example according to the third embodiment.

The IAB node 300 starts processing in step S30, and then, is configured with a conditional handover by the IAB donor 200 in step S31.

In step S32, the IAB node 300 receives a flow control feedback message from the parent node. The IAB node 300, upon receiving the flow control feedback message, performs local rerouting. Here, the "local rerouting" is described.

Local Rerouting

In the 3GPP, when a BH RLF occurs in a backhaul link, local rerouting is performed, and a data packet is transferred via an alternative path. Generally, the IAB donor 200 makes a routing configuration for each IAB node 300. Each IAB node 300 selects a relay node to transfer the data packet from a plurality of relay nodes in accordance with the routing configuration. The local rerouting is, for example, ignoring such a routing configuration, selecting an alternative path, and transferring the data packet to the alternative path. Since the data packet is transferred from a first IAB node to a second IAB node on the alternative path through the local rerouting, the delay of the data packet transfer can be reduced, for example.

In the third embodiment, in the example of FIG. 9, the parent node 300-P1 can transmit a flow control feedback message to the IAB node 300-T when a buffer size of the parent node 300-P1 exceeds a certain volume. The IAB node 300-T can recognize, by receiving the message, the occurrence of "crowding" in the parent node 300-P1. Then, the IAB node 300-T, upon confirming the situation of "crowding" in the parent node 300-P1, executes local rerouting. In the example of FIG. 9, the IAB node 300-T selects a path to the parent node 300-P2 as an alternative path by the local rerouting. The IAB node 300-T transfers the data packet to the alternative path. Thereby, for example, the "crowding" in the parent node 300-P1 can be eliminated. Step S32 in FIG. 13 may be "determine that the IAB node 300 is in a situation to perform local rerouting".

In step S33, the IAB node 300 receives a Type 1 Indication, a Type 2 Indication, or a Type 1/2 Indication from the parent node. The IAB node 300 confirms receiving the flow control feedback message from the parent node in conjunction with step S32 and receiving the failure occurrence notification message in step S33.

Note that the step S33 may be "receive a failure occurrence notification message from the same parent node in a situation where the IAB node 300 is performing local rerouting". The "same parent node" is, for example, a parent node on a path (or a main path) immediately before the IAB node 300 selects the alternative path. In the example of FIG. 9, since the parent node 300-P1 transmits the flow control feedback message, the parent node 300-P1 is the "same parent node".

In step S34, the IAB node 300 executes (or triggers) the conditional handover. In the example of FIG. 9, the IAB node 300-T executes the conditional handover to the parent node 300-P2.

Returning to FIG. 13, in step S35, the IAB node 300 terminates a series of processing operations.

Fourth Embodiment

A fourth embodiment is an example in which the IAB donor 200 configures which trigger condition is used in the IAB node 300 among a plurality of trigger conditions for the conditional handover. Specifically, a donor base station (e.g., the IAB donor 200) configures one or more trigger conditions to be used by a first relay node (e.g., the IAB node 300) among a plurality of trigger conditions related to the conditional handover, for the first relay node. Thereby, for example, the trigger condition can be configured according to the relay node.

Figure 14:
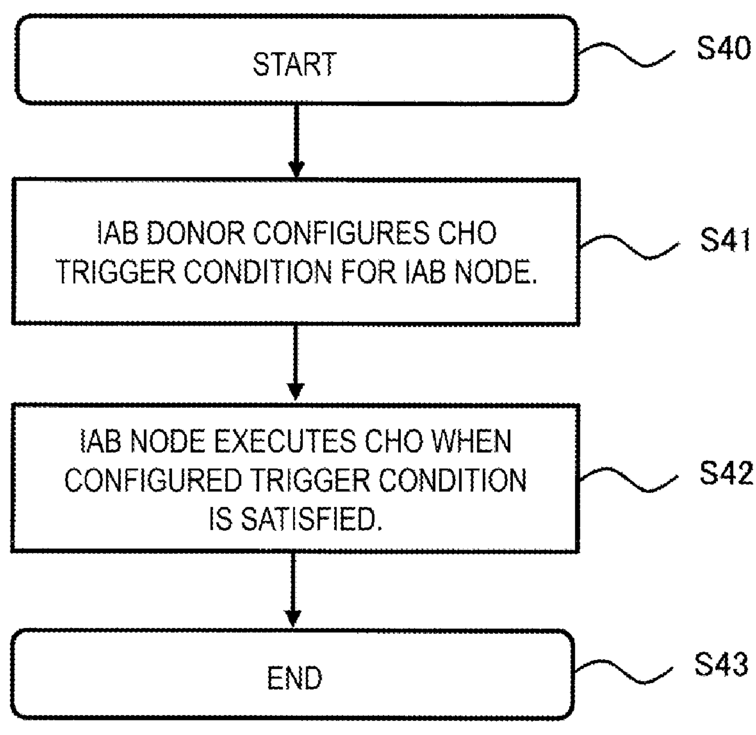
FIG. 14 is a diagram illustrating an operation example according to a fourth embodiment.

FIG. 14 is a diagram illustrating an operation example according to the fourth embodiment.

The IAB donor 200 starts processing in step S40, and then, configures one or more trigger conditions to be used by the IAB node 300 among a plurality of trigger conditions for the conditional handover, for the IAB node 300 in step S41. For example, the CU of the IAB donor 200 configures the trigger condition for the IAB-MT or the IAB-DU of the IAB node 300 using an RRC message, an F1-AP message, or the like. The trigger conditions include the following, for example.

(B1) Receiving a Type 4 Indication of a BH RLF.

(B2) Receiving a Type 1/2 Indication of a BH RLF.

(B3) Receiving a flow control feedback message from a parent node.

(B4) Failing to transfer a data packet for a certain period (second embodiment).

(B5) A threshold, a timer value, and an upper limit value of the number of times pertaining to the above (B1) to (B4).

The trigger condition(s) is one or more of the above (B1) to (B5). Since a plurality of trigger conditions are allowed, "receiving a Type 1/2 Indication of a BH RLF" (B2)+ "receiving a flow control feedback message from a parent node" (B3) may be configured as the trigger condition. As for (B2), the Type 1/2 Indication may be replaced with a Type 1 Indication or a Type 2 Indication.

In step S42, the IAB node 300 executes (or triggers) the conditional handover when the configured trigger condition is satisfied.

In step S43, the IAB node 300 terminates a series of processing operations.

Fifth Embodiment

Figure 15:
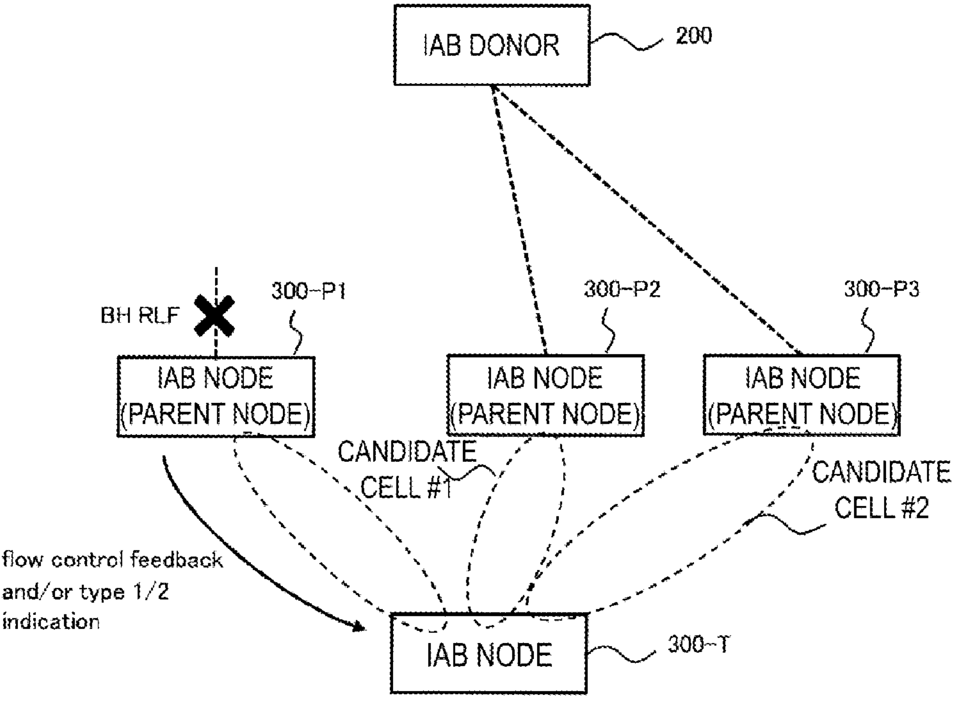
FIG. 15 is a diagram illustrating an example in which a plurality of candidate cells are present.

For example, as illustrated in FIG. 15, assume that the parent node 300-P1 of the IAB node 300-T transmits a Type 1/2 Indication of a BH RLF to the IAB node 300-T, and the IAB node 300-T triggers a conditional handover. Assume that a candidate cell #1 and a candidate cell #2 as candidate cells for conditional handover are present.

As described above, when the plurality of candidate cells #1 and #2 are present, the IAB node 300-T may not be able to determine which candidate cell to select. For example, assume that the IAB node 300-T selects a cell having the best radio condition, for example, the candidate cell #1, among the candidate cells #1 and #2.

However, the number of hops arriving at the target (the IAB donor 200 in the example of FIG. 15) from the IAB node 300-T via the parent node 300-P2 may be greater than the number of hops arriving at the target via the parent node 300-P3 managing the candidate cell #2. In this case, since the number of hops is larger in the former than in the latter, the delay of data packet transfer is larger.

Therefore, when the plurality of candidate cells #1 and #2 are present, selecting a candidate cell having the best radio condition may not necessarily mean selecting an optimum route.

As such, in the fifth embodiment, the IAB donor 200 configures priorities to the candidate cells for the conditional handover. Specifically, first, a donor base station (e.g., the IAB donor 200) configures a priority for each of the candidate cells for a first relay node (e.g., the IAB node 300-T). Second, the first relay node selects a candidate cell having the highest priority as a target cell and executes a conditional handover to the target cell. As a result, for example, an optimum route with less delay of the data packet transfer can be selected.

Figure 16:
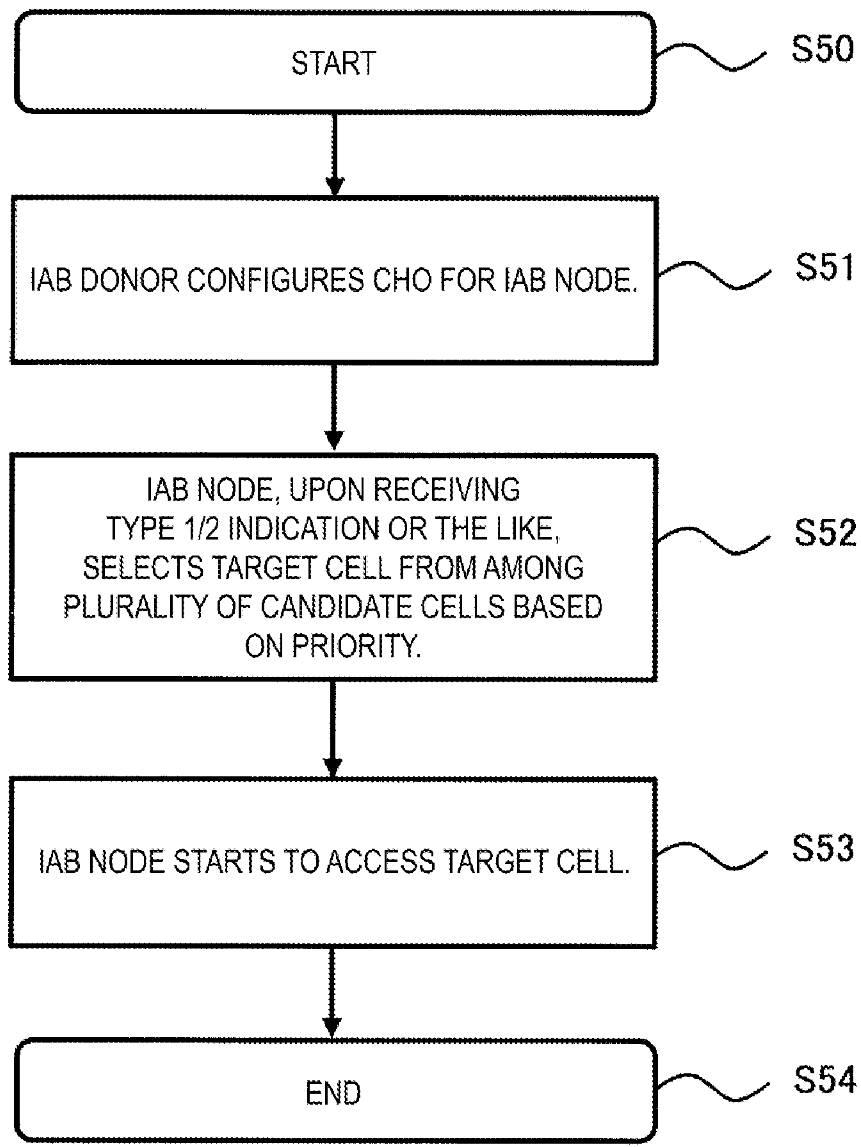
FIG. 16 is a diagram illustrating an operation example according to a fifth embodiment.

FIG. 16 is a diagram illustrating an operation example according to the fifth embodiment.

The IAB donor 200 starts processing in step S50, and then, configures a conditional handover for the IAB node 300-T in step S51. The CU of the IAB donor 200 may transmit an RRC Reconfiguration message, which includes the priorities for the respective candidate cells, to the IAB-DU (or UE 100) of the IAB node 300-T to perform the configuration, in addition to the candidate cells and the trigger conditions. For example, in the example of FIG. 15, the priority of the candidate cell #1 is "1", the priority of the candidate cell #2 is "2", and the like. Note that the configuration including the priorities may be performed using the F1-AP message and/or the MAC CE instead of the RRC reconfiguration message.

Note that the trigger condition for the conditional handover may be the trigger condition described in the first embodiment or the trigger condition described in the second embodiment or the third embodiment besides the receiving a Type 1/2 Indication of a BH RLF. Alternatively, the trigger condition may include the event A3 or the event A5. The event A3 is an event where the radio state of the neighbor cell is better than the radio state of the serving cell by a predetermined amount (predetermined offset) or more. The event A5 is an event where the radio state of the serving cell is worse than a first threshold, and the radio state of the neighbor cell is better than a second threshold.

Returning to FIG. 16, in step S52, the IAB node 300-T executes (or triggers) the conditional handover according to the configuration of the conditional handover when the trigger condition is satisfied, such as when the Type 1/2 Indication is received. When the plurality of candidate cells #1 and #2 are triggered, the IAB node 300-T selects a cell having the highest priority as a target cell based on the configured priorities. When a plurality of cells each having the highest priority are present, which cell is selected may depend on the implementation of the IAB node 300-T. For example, when a plurality of cells each having the highest priority are present, the IAB node 300-T may select a cell having the best radio quality as the target cell. The IAB node 300-T applies the configuration of the conditional handover to the selected target cell.

In step S53, the IAB node 300-T starts accessing the target cell in accordance with the applied configuration of the conditional handover.

In step S54, the IAB node 300-T terminates a series of processing operations.

In the fifth embodiment, the IAB donor 200 may further configure a minimum radio quality threshold for the IAB node 300-T as the configuration of the conditional handover. For example, the minimum radio quality threshold is a threshold for a radio quality represented by Reference Signal Received Power (RSRP), Reference Signal Received Quality (RSRQ), a Signal to Interference plus Noise Ratio (SINR), and/or the like. In this case, in step S52, when a plurality of candidate cells are triggered, the IAB node 300-T extracts candidate cells exceeding the minimum radio quality threshold and selects a cell having the highest priority among the extracted candidate cells. In this manner, configuring the minimum radio quality threshold allows a target cell satisfying the minimum radio quality to be selected. Therefore, the reliability of data packet transfer from the IAB node 300-T to the target cell (e.g., the parent node 300-P2) is ensured.

Sixth Embodiment

In the fifth embodiment, the example is described in which the target cell is selected from a plurality of candidate cells. For example, if a BH RLF occurs in the target cell selected by the IAB node 300, the conditional handover itself may fail because the RRC message or the like does not reach from the IAB node 300 to the IAB donor 200.

In the sixth embodiment, when a BH RLF occurs in a candidate cell for the conditional handover, the IAB node 300 excludes the relevant candidate cell from the candidate cells to not select the relevant candidate cell as a target cell.

Specifically, a first relay node (for example, the IAB node 300-T) selects a candidate cell as a target cell and executes the conditional handover to the target cell, when a backhaul link between a second relay node (for example, the IAB node 300-P1) managing the candidate cell (for example, the candidate cell #1) and a parent node of the second relay node is normal. When the backhaul link is not normal, the first relay node selects another candidate cell. Accordingly, for example, possible failures of the conditional handover can be reduced.

FIG. 17 is a diagram illustrating an operation example of the sixth embodiment.

The IAB donor 200 starts processing in step S60, and then, configures a conditional handover for the IAB node in step S61. The configuration of the conditional handover may include designation information for designating whether to confirm a BH RLF of a target cell. Similarly to the fifth embodiment, the designation information may be included in the RRC reconfiguration message, the F1-AP message, or the like together with the candidate cell and the trigger condition.

In step S62, the IAB node 300 executes (or triggers) the conditional handover when the trigger condition is satisfied, such as when the Type 1/2 Indication is received. Also in the sixth embodiment, assume that a plurality of candidate cells are triggered. The IAB-MT of the IAB node 300 selects a target cell as follows, for example.

In other words, the IAB node 300 first provisionally selects a target cell. For example, in the example of FIG. 15, the IAB node 300-T provisionally selects the candidate cell #1 (or the parent node 300-P2) as the target cell. The provisional selection of the target cell may be selection based on the priority as in the fifth embodiment. The provisional selection of the target cell may be selection from among the candidate cells exceeding the minimum radio quality threshold based on the priority.

The IAB node 300-T confirms whether a BH link of the provisionally selected target cell is normal (or whether a BH RLF occurs). Specifically, the IAB node 300-T confirms this based on whether the parent node 300-P2 transmits the Type 1/2 Indication. In other words, confirmed is whether a BH RLF occurs in a BH link between the parent node 300-P2 and the further parent node of the parent node 300-P2.

For example, the IAB node 300-T may confirm the received BAP Control PDU to confirm whether the parent node 300-P2 transmits the Type 1/2 Indication. For example, the IAB node 300-T may inquire of the parent node 300-P2 to confirm whether the Type 1/2 Indication is transmitted. When the IAB node 300-T is replaced with the UE 100, a UE 100 confirms the Type 1/2 Indication included in the broadcast SIB 1 to confirm whether the Type 1/2 Indication is transmitted. In the above operations, the Type 1/2 Indication may be replaced with the Type 1 Indication or the Type 2 Indication. Note that whether the BH RLF of the provisionally selected target cell is normal may be determined by the IAB node 300-T confirming whether the parent node 300-P2 transmits an IAB Support IE.

When the IAB node 300-T determines that the BH link of the provisionally selected target cell is normal, the IAB node 300-T selects the cell as the target cell. For example, in the example of FIG. 15, when the BH link of the provisionally selected parent node 300-P2 is normal, the IAB node 300-T selects the parent node 300-P2 (or the candidate cell #1 managed by the parent node 300-P2) as the target cell.

On the other hand, when the IAB node 300-T determines that the BH link of the provisionally selected target cell is not normal, the IAB node 300-T provisionally selects another candidate cell as the target cell. For example, in the example of FIG. 15, when the BH link of the parent node 300-P2 is not normal, the IAB node 300-T provisionally selects the candidate cell #2 (or the parent node 300-P3) and confirms whether a BH RLF occurs in the provisionally selected target cell. The confirmation method is the same as the above-described example. When a plurality of target cells to be provisionally selected are present, the target cell may be selected in accordance with the priority for each of the candidate cells.

Returning to FIG. 17, in step S63, the IAB node 300 starts accessing the target cell in accordance with the configuration of the conditional handover.

In step S64, the IAB node 300 terminates a series of processing operations.

Other Embodiments

In the first to sixth embodiments described above, the IAB node 300-T may be replaced with the UE 100. For example, as described in the first embodiment, the UE 100 can receive the flow control feedback message or the failure occurrence message from the parent node 300-P1 using the SIB 1 or the like. Therefore, the UE 100, when any of the trigger conditions described in the first to sixth embodiments is satisfied, can execute the conditional handover. The trigger condition to be configured in the UE 100 described in the third embodiment can also be configured by using the RRC message or the F1-AP message.

A program causing a computer to execute each type of processing performed by the UE 100, the gNB 200, or the IAB node 300 may be provided. The program may be recorded in a computer readable medium. Use of the computer readable medium enables the program to be installed on a computer. Here, the computer readable medium on which the program is recorded may be a non-transitory recording medium. The non-transitory recording medium is not particularly limited, and may be, for example, a recording medium such as a CD-ROM or a DVD-ROM.

Circuits for executing each type of processing to be performed by the UE 100, the gNB 200, or the IAB node 300 may be integrated, and at least part of the UE 100, the gNB 200, or the IAB node 300 may be configured as a semiconductor integrated circuit (a chipset or an SoC).

Although embodiments have been described in detail with reference to the drawings, a specific configuration is not limited to those described above, and various design modifications and the like can be made without departing from the scope of the present disclosure. All of or a part of the examples can be combined together as long as the combination remains consistent.

SUPPLEMENTARY NOTE

Introduction

A revised work item related to NR Enhancements to Integrated Access AND Backhaul (NR eIAB) was approved. Some of the purposes thereof are as follows.

Enhancements of Topology Adaptation

- Specification of procedures for inter-donor IAB-node migration to enhance robustness and load balancing, including enhancements to reduce signaling load.
- Specification of enhancements to reduce service interruption due to IAB-node migration and BH RLF recovery.
- Specification of enhancements to topology redundancy, including support for CP/UP separation.

Enhancements of Topology, Routing, and Transport

- Specification of enhancements to improve topology-wide fairness, multi-hop latency, and congestion mitigation.

Regarding the enhancements of topology adaptation, the following agreements are reached.

- Enhancements of topology adaptation are to be considered to improve robustness (e.g., for rapid shadowing), load balancing between different IAB nodes, between IAB donor DUs and IAB donor CUs, and signaling load reduction.

The RAN2 discusses enhancements of RLF indication/handling with a focus on reduction of service interruption after a BH RLF.

CHO and potential IAB-specific enhancements of CHO are under consideration.

DAPS and potential IAB-specific enhancements of DAPS are not excluded at this time (although how to support DAPS is not clear because no PDCP is present).

For message bundling, the RAN2 waits for at least further progress to be seen in the RAN3 for the topology adaptation procedure.

The RAN2 discusses local rerouting, including benefits over central route determination, and how to address topology-wide objectives.

In this supplementary note, various topics of the topology adaptation enhancement of Rel-17 eIAB.

Discussion

Enhancements of BH RLF Indication

In Rel-16 email discussion, four types of BH RLF notifications as illustrated in FIG. 18 were discussed. Ultimately, only "Recovery failure" corresponding to Type 4 was defined as Rel-16 BH RLF indication. This allows a child IAB-MT to recognize an RLF on a parent BH link to initiate an RLF recovery procedure.

Finding 1: In Rel-16, only "Recovery failure" corresponding to Type 4 was defined as the BH RLF indication.

The RAN2 agreed to "consider enhancements of topology adaptation to improve robustness (e.g., for rapid shadowing). This means that a BH RLF occurs more frequently in Rel-17 compared to Rel-16 as the radio states are assumed to change more dynamically.

Finding 2: In Rel-17, a BH RLF occurs more frequently compared to Rel-16 deployments because the radio states change more dynamically, such as rapid shadowing.

The problem in Rel-16 is that the child IAB node cannot transfer upstream data during RLF recovery of the parent, or even if the data is transferred, the parent cannot transfer the data due to a BH RLF. Thus, no data can reach the IAB donor in any case and service is interrupted.

Finding 3: Using Rel-16 BH RLF indication (Type 4) causes data transfer to be suspended at the IAB node while RLF recovery of the parent is in progress.

Thus, the child IAB node should be notified of a BH RLF of the parent as soon as possible in order to take appropriate action to reduce the delay. This is in line with the RAN2 agreement that "the RAN2 discusses enhancements of RLF indication/handling with a focus on reduction of service interruption after a BH RLF". Thus, the RAN2 should introduce a BH RLF indication "Trying to recover" corresponding to Type 2. Note that Type 1 and Type 2 have the same meaning.

Proposal 1: The RAN2 should agree with the fact that the BH RLF indication "Trying to recover" corresponding to Type 2 has been introduced. Whether the transmission is performed using the BAP Control PDU, the SIB 1, or both of these requires further study.

When introducing the Type 2 indication as in Proposal 1, it is very straight forward to introduce "BH link recovery" corresponding to Type 3 since the child IAB-MT should also be notified when the BH RLF of the parent is recovered. However, it should be considered whether such an explicit indication is indeed necessary, since the RAN2 agreed to "consider enhancements of topology adaptation to improve signaling load reduction". When the Type 3 indication is transmitted in a dedicated manner to all child IAB nodes (e.g., via a BAP Control PDU), significant overhead may occur.

Figure 19:
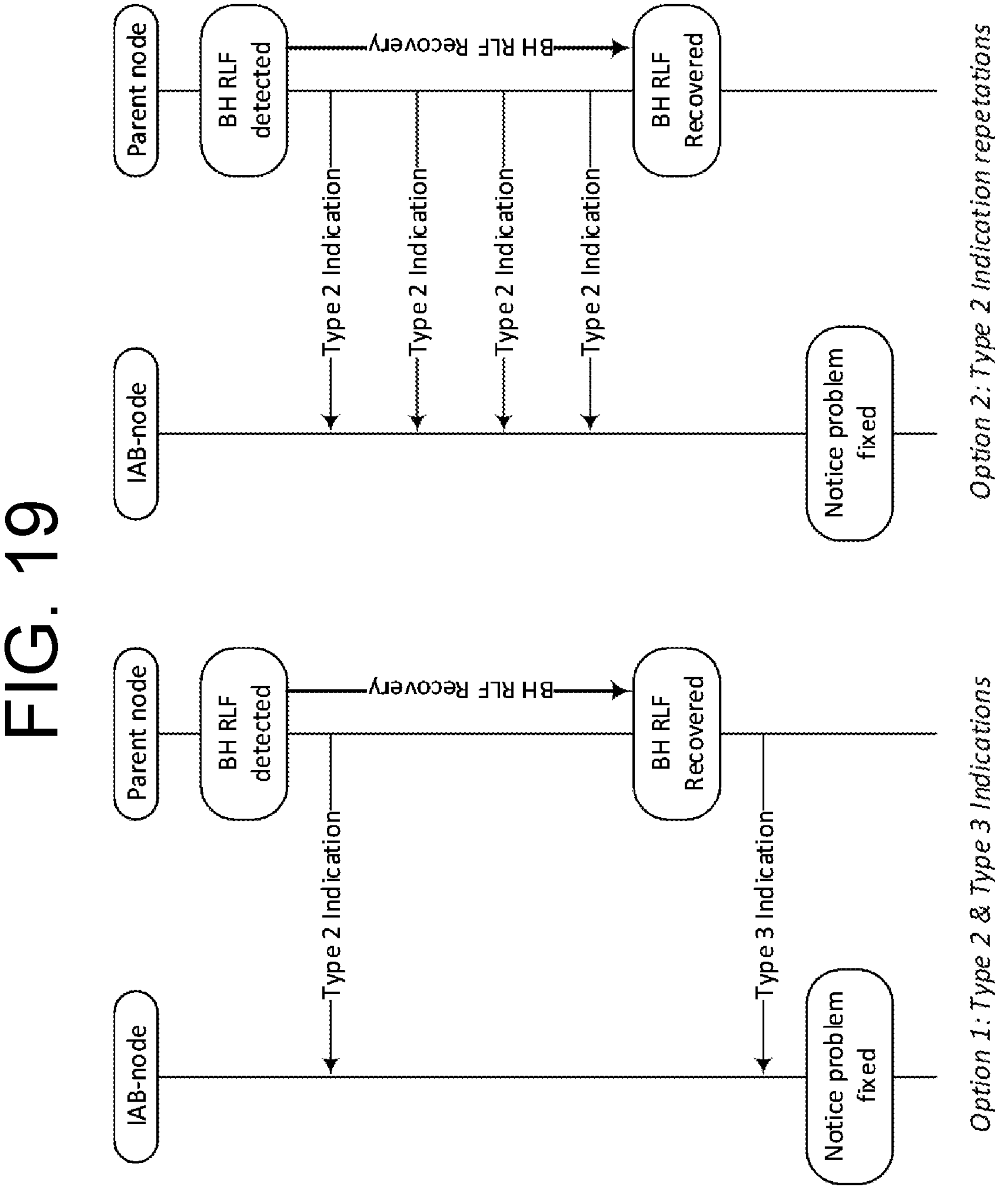
FIG. 19 is a diagram illustrating transmission options for an enhanced BH RLF indication.

For example, for the Type 2 Indication transmitted via the SIB 1, the indication is no longer broadcast when the BH link is not under the RLF (i.e., "recovered") as illustrated in Option 2 in FIG. 19. Therefore, downstream IAB nodes and the UE recognize whether the BH link has been recovered based on the absence of the Type 2 Indication in the SIB 1. As a matter of course, when the Type 3 Indication is transmitted via the BAP Control PDU, it has an advantage that the downstream IAB nodes can promptly know that the BH link has been recovered. However, the UE includes no BAP layer and thus disadvantageously fails to recognize the recovery. Thus, RAN2 should study whether the Type 3 Indication is really necessary.

Proposal 2: When Proposal 1 can be agreed on, the RAN2 should consider whether to introduce an explicit BH RLF indication, in other words, "BH link recovered" corresponding to Type 3, the indication being provided when the BH RLF is no longer present.

When Proposal 1 and/or Proposal 2 can be agreed on, the operation of the IAB-MT, which has received the indication, regarding during recovery of the BH link should be considered. The following was proposed: when the IAB-MT receives the Type 2 Indication, the IAB-MT reduces/stops the SR, and when the IAB-MT receives the Type 3 Indication (i.e., the BH RLF is no longer present in the parent IAB node), the IAB-MT resumes operation. This is one desirable operation of the IAB-MT when the parent node is trying to recover the BH link. It is assumed that other operations of the IAB-MT, such as operation of suspending all of the RBs, are also possible.

Proposal 3: The RAN2 should agree with that the IAB-MT, which has received the Type 2 Indication and then reduced/stopped the scheduling request, resumes the scheduling request when the BH RLF is no longer present in the parent node.

In consideration of the agreement that "the RAN2 discusses enhancements of RLF indication/handling with a focus on reduction of service interruption after a BH RLF", it should rather discuss how the IAB-MT operates to reduce service interruption. Local rerouting and conditional handover (CHO) enhancements may be considered as candidates for solutions when combined with BH RLF indication, but they are still under consideration. In our view, a common aspect of local rerouting and CHO is that certain kinds of trigger conditions are required. As such, the Type 2 indications may serve such purposes. Thus, in addition to Proposal 3, the RAN2 should discuss other IAB-MT operations performed when the parent node is attempting to recover from the BH RLF.

Proposal 4: The RAN2 should discuss other IAB-MT operations when receiving a BH RLF indication of Type 2. Although further considerations are needed, these are, for example, triggering local rerouting and/or conditional handover.

Enhancements of Conditional Handover

The conditional handover (CHO) is introduced in Rel-16 to improve mobility robustness. In our understanding, the CHO can be used for the designated Rel-16 IAB. The RAN2 agreed that "CHO and potential IAB-specific enhancements of CHO are under consideration". Therefore, it is worth considering the CHO enhancements of eIAB in addition to Rel-16 CHO baseline. Rel-16 CHO is executed when the corresponding CHO event (A3/A5) is satisfied or when a selected cell is a CHO candidate as a result of cell selection for RRC reestablishment as illustrated in FIG. 20.

The CHO event A3/A5 can be satisfied when the IAB node experiences a BH RLF on the BH link. On the other hand, these trigger conditions cannot be satisfied for an IAB-specific RLF, i.e., an RLF due to reception of a BH RLF indication (Type 4), because the radio state of the BH link of the IAB node itself is good. In this case, one desirable operation is to execute CHO when the IAB node receives the BH RLF indication.

Finding 4: The Rel-16 CHO is not automatically triggered/executed due to the CHO event A3/A5 in the IAB-MT because the BH RLF recovery of the parent is in progress, and even if the recovery fails, the BH link between the IAB-MT and the parent is still good.

Therefore, in order to improve the topology adaptation of Rel-17 eIAB, it is worth discussing additional trigger conditions for CHO. At least the existing BH RLF indication (i.e., Type 4) is considered to be a promising candidate as a new trigger, but if introduced, further discussion can be conducted on whether CHO should be also executed upon receipt of the Type 2 Indication.

Proposal 5: The RAN2 should discuss whether additional trigger conditions for CHO are defined at least when the IAB node receives the BH RLF indication (type 4). When the additional trigger condition is introduced, further consideration is needed to see if is applicable to Type 2.

When Proposal 5 is agreed on, the problem may arise that CHO may be triggered at the same time for all CHO candidates (i.e., candidate cells), because of a kind of "forced" trigger by the BH RLF indication although not depending on the CHO event A3/A5.

In the current specification, "if multiple NR cells are triggered in conditional reconfiguration execution, it is up to UE implementation which one to select. For example, the UE considers beams and beam quality to select one of the triggered cells for execution". This is primarily intended for the UE.

Finding 5: In Rel-16 CHO, when a plurality of candidate cells trigger CHO execution, it is up to the UE implementation which cell to select.

It may not always be the best for the IAB-MT when the IAB-MT selects one of the cells triggered by the implementation depending on local radio quality, etc., because the topology-wide objectives are properly handled by the IAB donor. Thus, the RAN2 should discuss how to confirm CHO execution of IAB donor control for additional trigger conditions such as Proposal 5. For example, the IAB donor may configure priority information associated with the CHO candidate in the CHO configuration. The IAB-MT should select the highest priority cell from all triggered CHO candidates that satisfy a certain radio quality (e.g., S-criterion).

Proposal 6: The RAN2 should consider whether the CHO execution of IAB donor control is required as an additional enhancement when all candidate cells trigger the CHO upon reception of an BH RLF indication.

Enhancements of Local Rerouting

In Rel-16, the local rerouting is allowed only when a BH RLF occurs, as described below.

NOTE: for example, data buffering in a transmission part of a BAP entity is up to the implementation until an RLC-AM entity receives an acknowledgment response. For a BH RLF case, the transmission part of the BAP entity may re-route the BAP data PDUs, which has not been acknowledged by the lower layers before the BH RLF, to the alternative path.

This indicates that the local rerouting is beneficial to improve robustness and service interruption due to the BH RLF. Thus, Rel-17 should be aimed at applying local rerouting to other cases, agreed upon by the RAN2, to improve load balancing, signaling reduction, robustness and/or service interruption. It is worth considering additional conditions for starting/stopping the local rerouting other than BH RLF, such as by receiving a BH RLF indication as in Proposal 4 (to improve robustness/service interruption) and/or by receiving flow control feedback (for load balancing/congestion mitigation). In other words, in general, the parent and/or child should be able to trigger the local rerouting of the IAB node under certain conditions.

Finding 6: In Rel-16, local rerouting is allowed only for a BH RLF case. This improves robustness and service interruption.

Proposal 7: The RAN2 should discuss whether an additional condition is introduced to start/stop local rerouting. This allows other IAB nodes to trigger, such as by receiving a BH RLF indication as in Proposal 1 and/or by receiving flow control feedback.

When agreed on, not only in other cases in Rel-17, i.e., BH RLF, "the RAN2 discusses local rerouting, including benefits over central route determination, and how to address topology-wide objectives", thus, the problem in Rel-16 should be considered from a viewpoint of the topology-wide objectives. Needless to say, the IAB donor has complete knowledge and control over the IAB topology and thus handles the topology-wide objectives.

In Rel-16 local rerouting, it is up to the implementation of the IAB node which path is selected as an alternative path as long as the destination is the same. This means that local rerouting is based on local determinations and cannot be controlled from a viewpoint of the IAB donor. This may not be consistent with the topology-wide objectives, especially when many local determinations occur and accumulate in the IAB topology.

Finding 7: In Rel-16 local rerouting, which path is selected as the alternative path is up to the implementation of the IAB-MT.

Thus, when local rerouting is enhanced beyond a BH RLF case, the controllability of the IAB donor should become more important. Since the IAB node needs to select the alternative path when performing local rerouting, it is straight forward that the IAB donor can configure the alternative path. Modeling of the alternative path needs to be further considered for such as whether alternative paths have the same routing ID.

Proposal 8: The RAN2 should consider whether the IAB donor can configure an alternative path for the IAB node in addition to Rel-16 routing configuration.

As another aspect of the controllability of the IAB donor, it should be taken into account that the IAB donor should recognize local rerouting and may start/stop the local rerouting at the IAB node for coexistence of the local rerouting and topology-wide objectives. For example, the IAB donor may consider whether the topology-wide objectives are still achieved based on recognition of which IAB node is currently performing the local rerouting. When the IAB donor finds that the topology-wide objectives cannot be achieved, the IAB donor may instruct the IAB node to start/stop local rerouting, or the IAB donor may change the routing configuration for the entire IAB topology.

How to address the topology-wide objectives through the local rerouting is completely up to the implementation of the IAB donor, but the IAB donor may need information and controllability of the local determination of the IAB node.

Proposal 9: The RAN2 should discuss whether the IAB node needs to notify the IAB donor when starting/stopping local rerouting.

Proposal 10: The RAN2 should discuss whether the IAB donor can instruct the IAB node to start/stop local rerouting.

Enhancements of BH RLF Recovery and Cell (Re)Selection

In an RRC reestablishment procedure, the IAB-MT first executes a cell selection procedure in order to find an appropriate cell. In the cell selection procedure, potential problems were pointed out in Rel-16, such as one that the IAB-MT may select its descendant node. Thus, this was discussed in email discussion.

As illustrated in FIG. 21, five possible solutions were discussed and summarized together with the rapporteur's view.

The conclusion was that "no further action is taken on this topic in Rel-16". This means that RAN2 agreed on "Option 4: Nothing needed since RRC reestablishment will fail if there is no BH connectivity". Option 4 requires waiting for a failure (expiry of T301) and finally going to an idle state and was thus acceptable in a Rel-16 deployment scenario even when further time is required for BH RLF recovery.

Finding 8: In Rel-16, when the IAB node attempts an RRC reestablishment request to the descendant node, the IAB node needs to wait for a failure of the attempt, and finally go to an idle state.

In Rel-17, from the viewpoint of Finding 2, cell (re) selection and RRC reestablishment may further frequently occur. Thus, suboptimal operation, in other words, operation in accordance with Finding 8, shall cause significant deterioration in performance from the viewpoint of stability of the IAB topology and service continuity. Thus, in order to optimize the operation of the IAB-MT during BH RLF recovery, "the topic can be discussed again in Rel-17", as stated by the rapporteur of the above email discussion.

Proposal 11: RAN2 should agree to study optimization of cell (re)selection in order to avoid reestablishment to an inappropriate node (for example, a descendant node).

It may be assumed that a common concept in the solutions identified except for Option 4 above is that the IAB-MT is provided with a type of either a permission list or a block list for the purpose of cell selection. For example, given that topology changes may frequently occur in Rel-17 due to "inter-donor IAB-node migration", the permission list and the block list have advantages and disadvantages depending on the topology and the positions of the IAB nodes.

For example, from the viewpoint of an IAB node close to an IAB donor, in other words, the uppermost in DAG topology, because the number of candidate nodes is small, and in some cases only an IAB donor DU, providing the permission list is more reasonable.

However, in another example from a viewpoint of an IAB node very distant from the IAB donor, in other words, the lowermost in DAG topology, a great number of candidate nodes may need to be included in the permission list. Instead, for example, the block list may be more suitable because the block list includes only downstream IAB nodes of the IAB node to be concerned and in some cases includes only a small number of child IAB nodes, thus reducing overhead.

One of the concerns about the permission list is that, due to the properties of "the inter-donor IAB-node migration" in Rel-17, the list may need to include candidate IAB nodes belonging to different/adjacent IAB topologies, and may thus have an increased size. On the other hand, downstream IAB nodes of course belong to the same IAB topology, and thus the block list includes no such concerns.

Finding 9: The permission list and the block list have advantages and disadvantages depending on the topology and the positions of the IAB nodes.

Thus, when information is provided to the child IAB node for the purpose of cell selection, the IAB donor (or the parent IAB node) may be desirably able to select the use of either the permission list or the block list. Note that study should be also conducted on whether the reuse of this information for the purpose of cell reselection is beneficial.

Proposal 12: RAN2 should agree to provide the permission list or the block list (i.e., selection structure) to the IAB-MT for the purpose of cell selection in order to avoid reestablishment to a descendant node. Whether these lists can also be used for a cell reselection procedure requires further study.

If Proposal 12 can be agreed on, how to provide the information (in other words, the permission list or the block list) should be further studied. Option 1 assumes CHO configuration, and some enhancements may be required. Option 2 assumes additional indications, for example, the BH RLF indication of Type 2. Option 3 assumes provision of information of the overall topology, which is not present in the existing configuration. Option 5 assumes OAM-based configuration; however, this is questionable as the rapporteur pointed out.

Considering again the assumption of Rel-17 (i.e., Proposal 2), in other words, the need for the parent IAB node or the IAB donor to provide the list to the child IAB node in response to a topology change, the permission list/block list needs to be dynamically provided. Thus, Option 5, in other words, OAM, should be excluded. Which method, in other words, which method out of Options 1, 2, and 3, is to be used as the baseline for the enhancements requires further study.

Proposal 13: RAN2 should agree that the parent IAB node or the IAB donor dynamically provides the permission list/block list each time the topology is changed. The details thereof require further study.

Enhancements of Lossless Delivery

In the stage of research of Rel-15, the problem of multi-hop RLC ARQ was discussed and captured in Section 8.2.3 of TR. In Rel-16, the protocol stack was defined for the IAB including unsplit RLC layers. In other words, in Rel-16, end-to-end ARQ was excluded, and hop-by-hop ARQ was adopted.

Regarding the hop-by-hop ARQ, the problem in end-to-end reliability, in other words, lossless delivery with UL packets, was identified. As illustrated in FIG. 22, three solutions were identified and evaluated.

In Rel-16, "Modification of PDCP protocol/procedures" being a first solution was not adopted because it would affect a Rel-15 UE.

"Rerouting of PDCP PDUs buffered on intermediate IAB-nodes" corresponding to a second solution was supported as an implementation selection in the BAP layer. The BAP layer may implement the second solution on the assumption that "data buffering in a transmission part of a BAP entity until an RLC-AM entity receives an acknowledgment response is implementation dependent, for example". These BAP implementations were considered in order to avoid packet loss in "most" of the cases of the Rel-16 deployment scenario, in other words, the cases where stationary IAB nodes are used. However, the implementations were not perfect as illustrated in FIG. 36, for example.

"Introducing UL status delivery" corresponding to a third solution was a promising solution for guaranteeing lossless delivery of UL data, with evaluation results cited in FIG. 36 taken into consideration. The idea was to delay the RLC ARQ to the UE, so that PDCP data recovery at the UE is initiated when necessary. However, this was not defined in Rel-16 because it had been assumed that UL packets would be rarely dropped due to topology change as the stationary IAB node was assumed.

Considering the assumption of Rel-17, in other words, from the viewpoint of Proposal 1, it is no longer rare that UL packets are lost during the topology change, which occurs frequently in Rel-17, and thus the third solution should be further studied. Thus, RAN2 should discuss an enhancement mechanism for guaranteeing lossless delivery in an L2 multi-hop network, in addition to the results captured in TR.

Proposal 14: RAN2 should agree to introduce a solution identified in TR 38.874, in other words, a mechanism to guarantee lossless delivery under a condition that the topology change possibly frequently occur based on some form of "UL status delivery".

For the details of the third solution, in other words, "Introducing UL status delivery", two options, namely C-1 and C-2, were discussed via email as illustrated in FIG. 23.

Regarding C-1 above, it is assumed that a "confirmation" from the IAB donor needs to be defined in the BAP or the RRC for end-to-end signaling transfer via the multi-hop L2 network. Thus, in order to define the option, a relatively high standard effort shall be required.

Regarding C-2 above, when C-2 fully functions in the IAB topology and the RLC ACK is to be transmitted to the UE (or the downstream IAB node) even if it needs to be assumed that OAM configures all of the IAB nodes with the use of the option, it finally depends on IAB-DU implementation, and thus C-2 can be actually implemented for a Rel-16 IAB node as well. Because hop-by-hop feedback is assumed and no additional Control PDUs are assumed, C-2 is easier to implement than C-1. Thus, C-2 should be the baseline for the enhancements of Rel-17 for lossless delivery of the UL packets.

Finding 10: C-2 being a solution of "Introducing UL status delivery" may be the baseline for the enhancements of Rel-17, and this can be implemented for Rel-16 as well.

Note that, because Rel-17 should assume dynamic topology change that causes UL packet loss, the enhancements of Rel-17 shall support C-2 as a standard support function. At least in the specification of stage 2, an overall mechanism based on C-2 should be described. Otherwise, in the 3GPP standard, lossless delivery is not guaranteed during the handover of the IAB node. In stage 3, although minor changes such as those of the RLC and/or the BAP are expected, these are regarded as internal operations of the IAB node, and thus details thereof may not be defined.

Proposal 15: RAN2 should agree to define an RLC ARQ mechanism for lossless delivery of UL packets in stage 2. This delays transmission of the ACK to the child node/UE before the ACK is received from the parent IAB node (i.e., C-2). Whether to define this in stage 3/how to define this require further study.

Inter-Donor IAB-Node Migration

The IAB node integration procedure is introduced into Rel-16 and is used for the initial integration of IAB nodes. In other words, the IAB node integration procedure is still outside the service.

Rel-17 is intended to specify the inter-donor IAB-node migration, which provides robust operation and is to be applied to mobile IAB nodes. In contrast to Rel-16, the inter-donor IAB-node migration in Rel-17 is performed in a working phase, and thus the inter-donor IAB-node migration of one IAB node affects the entire topology and causes service interruption. In other words, for the Rel-17 inter-donor IAB-node migration, study needs to be conducted about how each of all IAB nodes in the IAB topology migrates to another IAB donor, specifically how RRC reconfiguration with synchronization (i.e., handover command) is provided to the affected IAB nodes.

Figure 24:
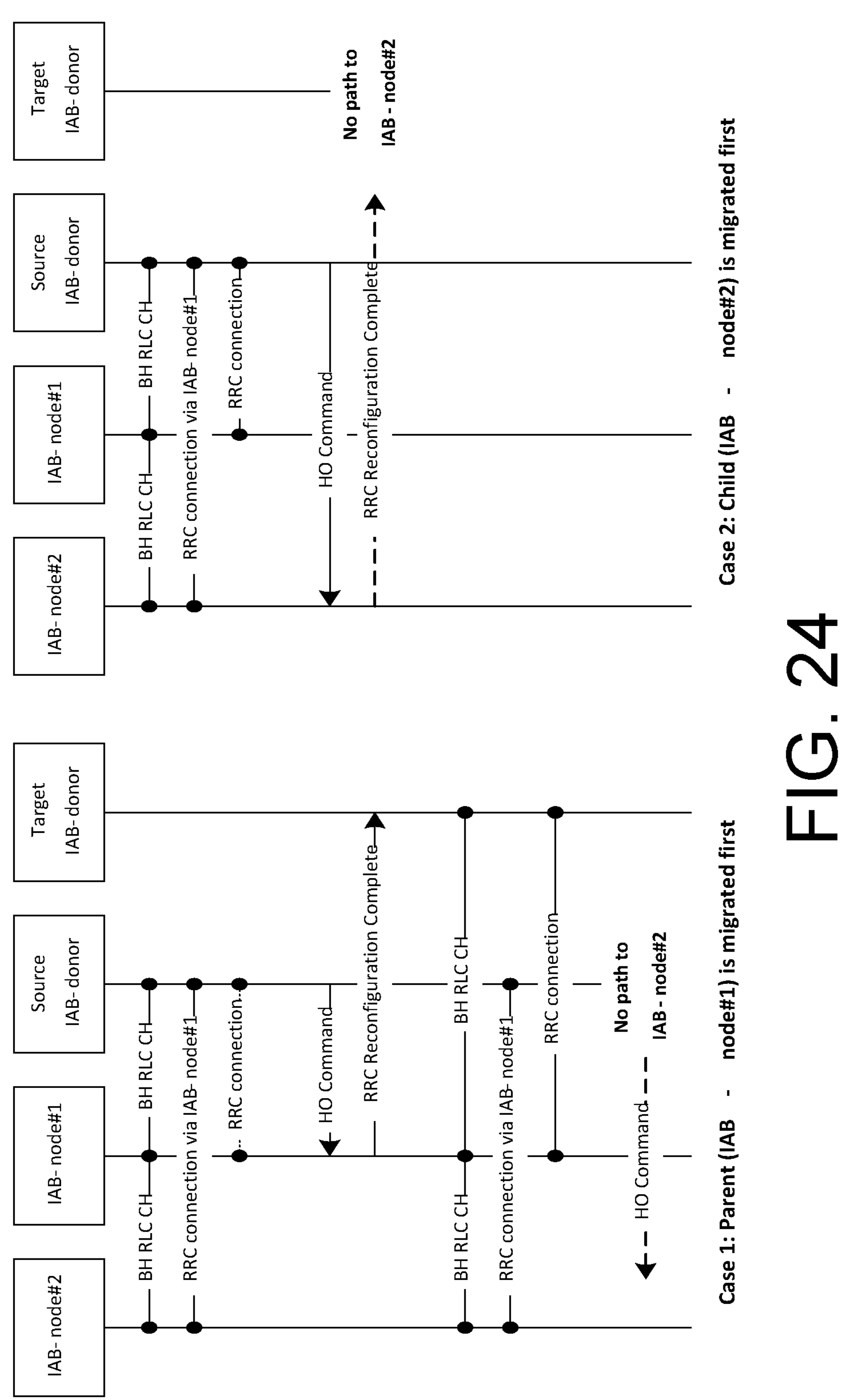
FIG. 24 is a diagram illustrating potential RAN2 signaling occurred during inter-donor IAB-node transition.

As illustrated in FIG. 24, assuming that a child node (IAB node #2) is connected to a source IAB donor via a parent node (IAB node #1), a set of signaling problems may occur.

Case 1: When the parent is first migrated, the RRC signaling path between the child and the source donor is released. Therefore, how the child node can be migrated is unknown.

Case 2: When the child is first migrated, the RRC signaling path to the target donor via the parent node has yet to be established. Accordingly, how the child node accesses the target donor (i.e., how to complete and transmit the RRC reconfiguration to the target donor) is unknown.

For Case 1, the CHO may be reused using some enhancements of the child node. In other words, when the parent node is migrated, the CHO is executed in the child node.

For Case 2, the transmission of the child node's RRC reconfiguration to the target donor may be delayed by the parent node of the child node, for example.

In either case, an option may be that the child node is first released and that re-integration is then performed by using the Rel-16 procedure. However, this may not a desirable solution for Rel-17, considering critical service interruption.

Although RAN3 has been discussing the general procedure of the inter-donor IAB-node migration, RAN2 needs to study the impact of RAN2 on how to reconfigure a plurality of IAB nodes in a multi-hop network.

Proposal 16: RAN2 needs to study how to reconfigure multi-hop IAB nodes for the inter-donor IAB-node migration.

The invention claimed is:

1. A communication control method used in a cellular communication system, the communication control method comprising:

receiving, by a relay node, a flow control feedback message or a failure occurrence notification message from a parent node of the relay node;

measuring, by the relay node, a certain period after receiving the flow control feedback message or the failure occurrence notification message; and executing, by the relay node, a conditional handover in response to the certain period elapsing, wherein the conditional handover is not executed for the certain period unless the relay node receives the flow control feedback message from the parent node and to further receiving the failure occurrence notification message from the parent node, and the conditional handover is executed without the certain period elapsing in response to receiving the flow control feedback message from the parent node and to further receiving the failure occurrence notification message from the parent node.

2. The communication control method according to claim 1, wherein the failure occurrence notification message comprises at least one of a message indicating that a radio link failure of a backhaul link between the relay node and the parent node is detected and a message indicating that recovery from the radio link failure of the backhaul link is being attempted;

measuring, by the relay node, a certain period after transmitting a scheduling request or a buffer status report to the parent node, receiving the data packet from a child node of the relay node, detecting a radio problem with the parent node, or triggering a radio measurement report to the parent node; and executing, by the relay node, a conditional handover in response to the relay node failing to transfer the data packet for the certain period.

3. The communication control method according to claim 1, further comprising:

performing, by a donor base station comprising the relay node under control of the donor base station, a configuration related to the conditional handover for the relay node, wherein the executing comprises, by the relay node, the conditional handover based on the configuration.

4. The communication control method according to claim 3, wherein the performing the configuration comprises configuring, by the donor base station, one or more trigger conditions to be used by the relay node among a plurality of trigger conditions related to the conditional handover for the relay node, and the executing comprises executing, by the relay node, the conditional handover when the one or more trigger conditions that are configured are satisfied.

5. The communication control method according to claim 3, wherein the performing the configuration comprises configuring, by the donor base station, priorities of respective candidate cells for the relay node, and the executing comprises, by the relay node, selecting a candidate cell having a highest priority as a target cell and executing the conditional handover to the target cell.

6. The communication control method according to claim 5, wherein the performing the configuration comprises configuring, by the donor base station, a minimum radio quality threshold for the relay node, and the executing comprises, by the relay node, selecting a candidate cell having a highest priority as a target cell from among candidate cells having radio quality exceeding the minimum radio quality threshold and executing the conditional handover to the target cell.

7. The communication control method according to claim 4, wherein the executing comprises, by the relay node, selecting a candidate cell as a target cell and executing the conditional handover to the target cell, when a backhaul link between a second relay node managing the candidate cell and a parent node of the second relay node is normal, and selecting, by the relay node, another candidate cell when the backhaul link is abnormal.

* * * * *